(12) United States Patent
Watfa et al.

(10) Patent No.: US 11,496,449 B2
(45) Date of Patent: *Nov. 8, 2022

(54) SYSTEM ENHANCEMENTS FOR ENABLING NON-3GPP OFFLOAD IN 3GPP

(71) Applicant: InterDigital Patent Holdings, Inc., Wilmington, DE (US)

(72) Inventors: Mahmoud Watfa, Saint Leonard (CA); Guanzhou Wang, Brossard (CA); Saad Ahmad, Montreal (CA); Pascal M. Adjakple, Great Neck, NY (US); Ulises Olvera-Hernandez, London (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,561

(22) Filed: Feb. 6, 2020

(65) Prior Publication Data
US 2020/0177565 A1 Jun. 4, 2020
US 2022/0294772 A9 Sep. 15, 2022

Related U.S. Application Data

(63) Continuation of application No. 14/026,546, filed on Sep. 13, 2013, now Pat. No. 10,581,813.
(Continued)

(51) Int. Cl.
*H04L 9/40* (2022.01)
*H04W 76/15* (2018.01)
(Continued)

(52) U.S. Cl.
CPC ......... *H04L 63/0485* (2013.01); *H04W 76/15* (2018.02); *H04W 92/045* (2013.01); *H04W 92/20* (2013.01)

(58) Field of Classification Search
CPC ......... H04W 28/0205; H04W 28/0289; H04W 48/20; H04W 36/0016; H04W 76/023;
(Continued)

(56) References Cited

U.S. PATENT DOCUMENTS

| 10,581,813 B2 * | 3/2020 | Watfa ................... H04W 76/15 |
| 2010/0091653 A1 | 4/2010 | Koodli et al. |

(Continued)

FOREIGN PATENT DOCUMENTS

| CN | 102084706 A | 6/2011 |
| CN | 101978727 B | 4/2013 |

(Continued)

OTHER PUBLICATIONS

United States Office Action, U.S. Appl. No. 14/026,546, filed Sep. 14, 2015, 12 pages.
(Continued)

*Primary Examiner* — Paul E Callahan
(74) *Attorney, Agent, or Firm* — Julian F. Santos

(57) ABSTRACT

Methods and apparatuses for offloading traffic from a third generation partnership project (3GPP) access network to a non-3GPP access point (AP) are disclosed. A 3GPP access network entity may receive subscription information associated with a wireless transmit receive unit (WTRU). The 3GPP access network entity may further receive traffic associated with the WTRU. The 3GPP access network entity may further determine whether to offload the traffic to the non-3GPP AP based on the subscription information. The 3GPP access network entity may also forward the traffic to the non-3GPP AP based on its determination.

18 Claims, 11 Drawing Sheets

Related U.S. Application Data

(60) Provisional application No. 61/701,262, filed on Sep. 14, 2012.

(51) Int. Cl.
    *H04W 92/20* (2009.01)
    *H04W 92/04* (2009.01)

(58) Field of Classification Search
    CPC ....... H04W 4/02; H04W 48/04; H04W 40/04; H04B 7/18591
    See application file for complete search history.

(56) References Cited

U.S. PATENT DOCUMENTS

| | | |
|---|---|---|
| 2011/0235546 A1 | 9/2011 | Horn et al. |
| 2012/0182912 A1 | 7/2012 | Watfa et al. |
| 2012/0189016 A1 | 7/2012 | Bakker et al. |
| 2012/0257598 A1 | 10/2012 | Karampatsis et al. |
| 2014/0011514 A1 | 1/2014 | Gu et al. |

FOREIGN PATENT DOCUMENTS

| | | |
|---|---|---|
| KR | 20120101515 A | 9/2012 |
| TW | 201236386 | 9/2012 |
| WO | WO 2010127511 A1 | 11/2010 |
| WO | WO 2011069119 A2 | 6/2011 |
| WO | WO 2012116252 A2 | 8/2012 |

OTHER PUBLICATIONS

3GPP Tdoc S2-104726, 3GPP TSG SA WG2 Meeting #81, Prague, Czech Republic, User Interaction for SIPTO Traffic Offloading, Oct. 11-15, 2010.
3rd Generation Partnership Project; Technical Specification Group Services and System Aspects; Study on S2a Mobility based On GTP & WLAN access to EPC (SaMOG); Stage 2 (Release 12), 3GPP TR 23.852 V12.0.0, Sep. 2013, 157 pages.
Official Notice of Rejection (English Translation), JP Patent Application No. 2015-532086, dated Mar. 15, 2016, 5 pages.
Official Notice of Rejection, JP Patent Application No. 2015-532086, dated Mar. 15, 2015, 5 pages.
3rd Generation Partnership Project; Technical Specification Group Services and System Aspects; Study on Support of BBF Access Interworking (Release 12), 3GPP TR 23.839 V1.6.1, Sep. 2012, 160 pages.
First Notification of Office Action (English Translation), Chinese Patent Application No. 201380048069.5, dated Aug. 3, 2017, 8 pages.
3rd Generation Partnership Project; Technical Specification Group Radio Access Network; Evolved Universal Terrestrial Radio Access Network (E-UTRAN); S1 Application Protocol (S1AP) (Release 10), 3GPP TS 36.413 V10.5.0, Mar. 2012, 255 pages.
3rd Generation Partnership Project; Technical Specification Group Services and System Aspects; Architecture enhancements for non-3GPP accesses (Release 11), 3GPP TS 23.402 V11.7.0, Jun. 2013, 252 pages.
3rd Generation Partnership Project; Technical Specification Group Services and System Aspects; Study on Support of BBF Access Interworking (Release 10), 3GPP TR 23.839 V0.2.0, Sep. 2010, 98 pages.
3rd Generation Partnership Project; Technical Specification Group Services and System Aspects; Study on Support of BBF Access Interworking (Release 11), 3GPP TR 23.839 V1.5.0, Feb. 2012, 154 pages.
First Notification of Office Action, Chinese Patent Application No. 201380048069.5, dated Aug. 3, 2017, 6 pages.
3rd Generation Partnership Project; Technical Specification Group Services and System Aspects; Architecture enhancements for non-3GPP accesses (Release 8), 3GPP TS 23.402 V8.10.0, Mar. 2012, 199 pages.
3rd Generation Partnership Project; Technical Specification Group Services and System Aspects; Architecture enhancements for non-3GPP accesses (Release 12), 3GPP TS 23.402 V12.2.0, Sep. 2013, 256 pages.
3rd Generation Partnership Project; Technical Specification Group Radio Access Network; Evolved Universal Terrestrial Radio Access Network (E-UTRAN); S1 Application Protocol (S1AP) (Release 11), 3GPP TS 36.413 V11.0.0, Jun. 2012, 258 pages.
3rd Generation Partnership Project; Technical Specification Group Radio Access Network; Evolved Universal Terrestrial Radio Access Network (E-UTRAN); S1 Application Protocol (S1AP) (Release 11), 3GPP TS 36.413 V11.4.0, Jun. 2013, 274 pages.
3rd Generation Partnership Project; Technical Specification Group Services and System Aspects; Architecture enhancements for non-3GPP accesses (Release 9), 3GPP TS 23.402 V9.12.0, Mar. 2012, 200 pages.
3rd Generation Partnership Project; Technical Specification Group Services and System Aspects; Study on S2a Mobility based On GTP & WLAN access to EPC (SaMOG); Stage 2 (Release 12), 3GPP TR 23.852 V1.4.0, Feb. 2013, 145 pages.
3rd Generation Partnership Project; Technical Specification Group Services and System Aspects; Study on support of Broadband Forum (BBF) access Interworking (Release 12), 3GPP TR 23.839 V12.0.0, Jun. 2013, 179 pages.
English Language Abstract, International Patent Application No. WO 2010/127511, Nov. 11, 2010, 2 pages.
English Language Abstract, Chinese Patent Application No. 101978727, Apr. 24, 2013, 2 pages.
3rd Generation Partnership Project; Technical Specification Group Radio Access Network; Evolved Universal Terrestrial Radio Access Network (E-UTRAN); S1 Application Protocol (S1AP) (Release 9), 3GPP TS 36.413 V9.8.0, Dec. 2011, 243 pages.
3rd Generation Partnership Project; Technical Specification Group Services and System Aspects; Architecture enhancements for non-3GPP accesses (Release 10), 3GPP TS 23.402 V10.8.0, Sep. 2012, 232 pages.
3rd Generation Partnership Project; Technical Specification Group Services and System Aspects; Architecture enhancements for non-3GPP accesses (Release 11), 3GPP TS 23.402 V11.2.0, Mar. 2012, 251 pages.
3rd Generation Partnership Project; Technical Specification Group Services and System Aspects; Study on S2a Mobility based On GTP & WLAN access to EPC (SaMOG); Stage 2 (Release 12), 3GPP TR 23.852 V1.1.0, May 2012, 41 pages.
Dimatteo et al.,Cellular Traffic Offloading through WiFi Networks, 2011 IEEE 8th International Conference on Mobile Adhoc and Sensor Systems (MASS), pp. 192-201, May 2011, 10 pages.
Intel Corporation et al.,New Study Item Proposal for Radio Level Dynamic Flow Switching between 3GPP-LTE and WLAN, 3GPP RP-111104, 3GPP TSG RAN#53, Fukuoka, Japan, Sep. 13-16, 2011, 5 pages.
Clarification on the association of PDN connections with SIPTO permissions, 3GPP TSG, 3GPP Tdoc S2-112746 SA WG2 Meeting #85, Xian, China, May 16-20, 2011, 10 pages.
Tomici et al.,Multi-RAT traffic offloading solutions for the bandwidth crunch problem, 2011 IEEE Long Island Systems, Applications and Technology Conference (LISAT), pp. 1-6, May 2011, 6 pages.
3rd Generation Partnership Project; Technical Specification Group Radio Access Network; Evolved Universal Terrestrial Radio Access Network (E-UTRAN); S1 Application Protocol (S1AP) (Release 8), 3GPP TS 36.413 V8.10.0, Jun. 2010, 217 pages.
3rd Generation Partnership Project; Technical Specification Group Radio Access Network; Evolved Universal Terrestrial Radio Access Network (E-UTRAN); S1 Application Protocol (S1AP) (Release 10), 3GPP TS 36.413 V10.6.0, Jun. 2012, 255 pages.

(56) References Cited

OTHER PUBLICATIONS

3rd Generation Partnership Project; Technical Specification Group Services and System Aspects; Architecture enhancements for non-3GPP accesses (Release 11), 3GPP TS 23.402 V11.4.0, Sep. 2012, 252 pages.
3rd Generation Partnership Project; Technical Specification Group Services and System Aspects; Network based IP flow mobility (Release 12), 3GPP TR 23.861 V1.5.0, Aug. 2012, 51 pages.
3rd Generation Partnership Project; Technical Specification Group Services and System Aspects; Study on S2a Mobility based On GTP & WLAN access to EPC (SaMOG); Stage 2 (Release 12), 3GPP TR 23.852 V1.2.0, Jul. 2012, 63 pages.
Nortel: "Handover to offload MME", 3GPP TSG SA WG2 Meeting #64, TD S2-082681, Jeju, Korea, Apr. 7-11, 2008, 5 pages.
"SIPTO Offload at a LIPA-enabled local network", 3GPP T-doc TD S2-111801, 3GPP TSG SA WG2 Meeting #84, Bratislava, Slovakia, Apr. 11-15, 3 pages.
3rd Generation Partnership Project; Technical Specification Group Services and System Aspects; LIPA Mobility and SIPTO at the Local Network; (Release 12), 3GPP TR 23.859 V0.5.0, May 2012, 55 pages.
3rd Generation Partnership Project; Technical Specification Group Services and System Aspects; Local IP Access and Selected IP Traffic Offload (LIPA-SIPTO) (Release 10), 3GPP TR 23.829 V10.0.1, Oct. 2011, 43 pages.

* cited by examiner

SYSTEM ENHANCEMENTS FOR ENABLING NON-3GPP OFFLOAD IN 3GPP

CROSS REFERENCE TO RELATED APPLICATIONS

This application is a continuation of U.S. patent application Ser. No. 14/026,546, filed Sep. 13, 2013, which is a National Stage Application filed under 35 U.S.C. 371 of International Application No. PCT/US13/59696, filed Sep. 13, 2013, and claims the benefit of U.S. Provisional Application No. 61/701,262 filed Sep. 14, 2012, the contents of which are incorporated by reference herein.

BACKGROUND

There has been an increase in the demand for IP traffic and as a result a need for more bandwidth to support IP services. The number of IP-based applications and services are expected to continue increasing along with the number of wireless transmit/receive units (WTRUs). Therefore, system capacity becomes an issue when supporting a high number of WTRUs requiring high speed connections.

The current Evolved Packet Core (EPC) allows the use of non-3GPP access to connect to an operator Packet Data Network Gateway (PDN GW) via a node referred to as the Evolved Packet Data Gateway (ePDG). However, in this scheme the 3GPP and non-3GPP access networks are not tightly coupled. As a result, there is a need for new architecture and procedures to support non-3GPP offload, such as WiFi offload, with tighter 3GPP radio access networks (RAN) and non-3GPP access network coupling.

SUMMARY

Methods and apparatuses for offloading traffic from a third generation partnership project (3GPP) access network to a non-3GPP access point (AP) are disclosed. In an embodiment, a 3GPP access network entity may receive subscription information associated with a wireless transmit receive unit (WTRU). The 3GPP access network entity may further receive traffic associated with the WTRU. The 3GPP access network entity may determine whether to offload the traffic to the non-3GPP AP based on the subscription information. Based on whether the 3GPP access network determined to offload traffic, the traffic may be forwarded to the non-3GPP AP.

BRIEF DESCRIPTION OF THE DRAWINGS

A more detailed understanding may be had from the following description, given by way of example in conjunction with the accompanying drawings wherein.

DETAILED DESCRIPTION

Figure 1A:
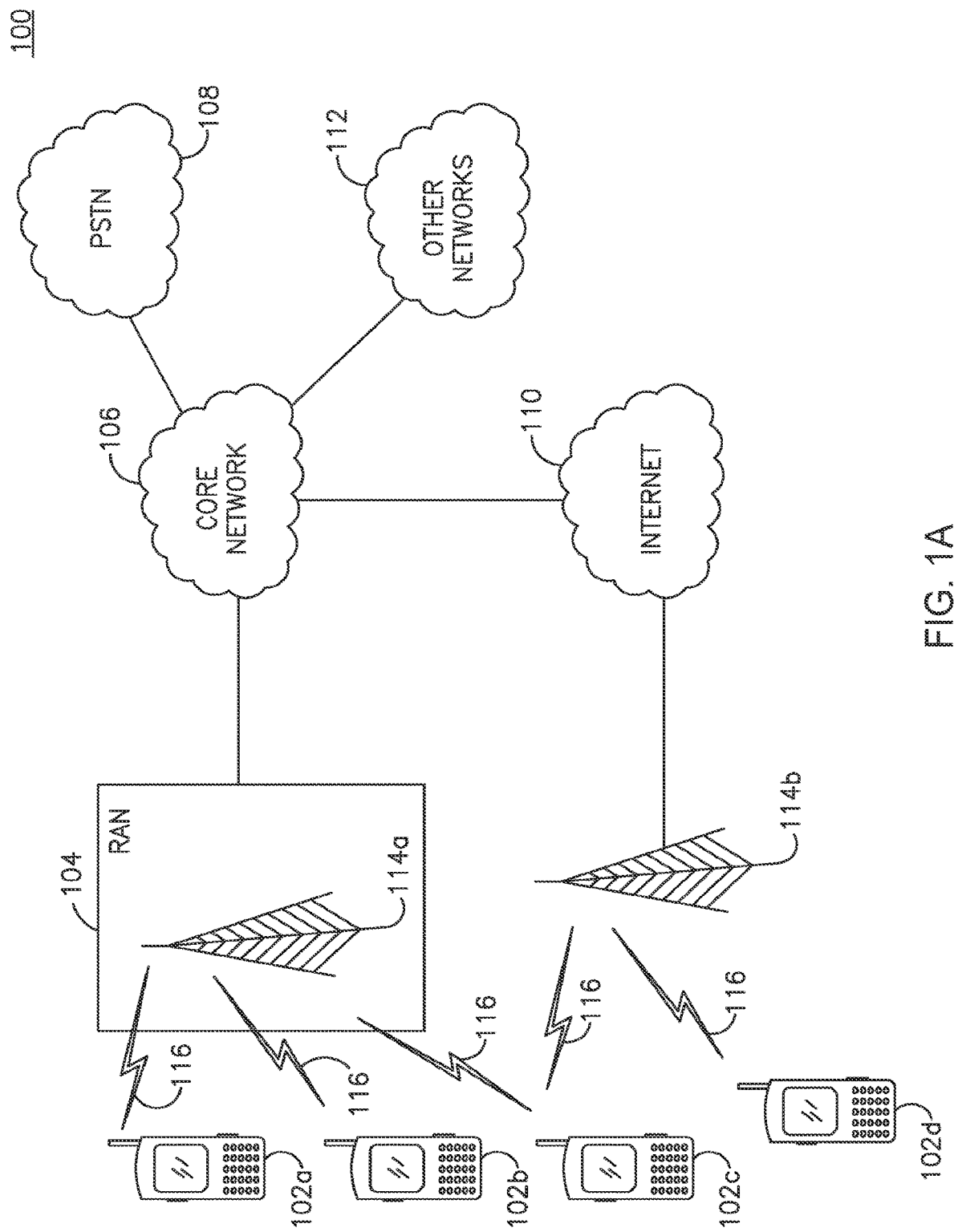
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B (HNB), Home eNode B (HeNB), or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
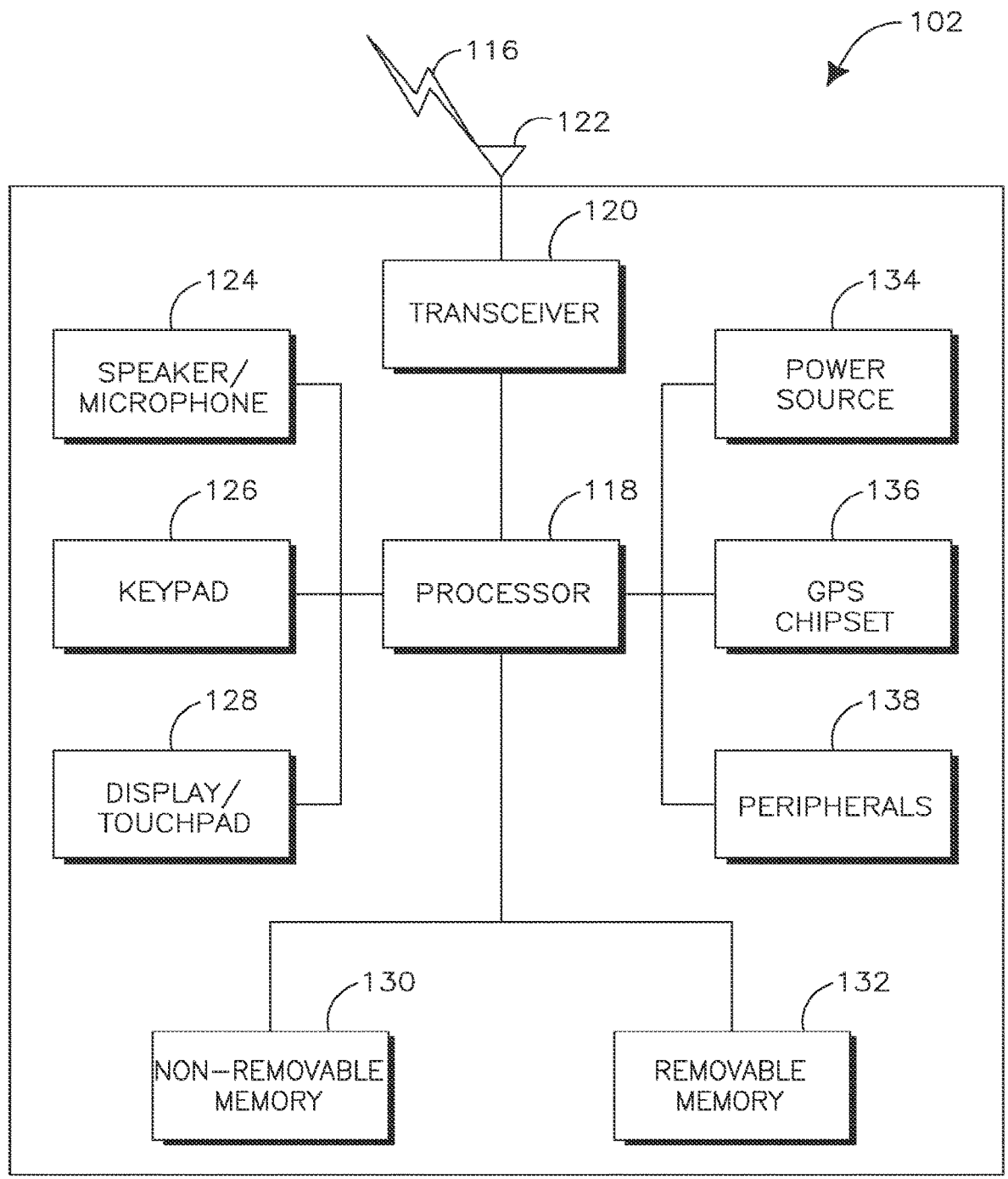
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
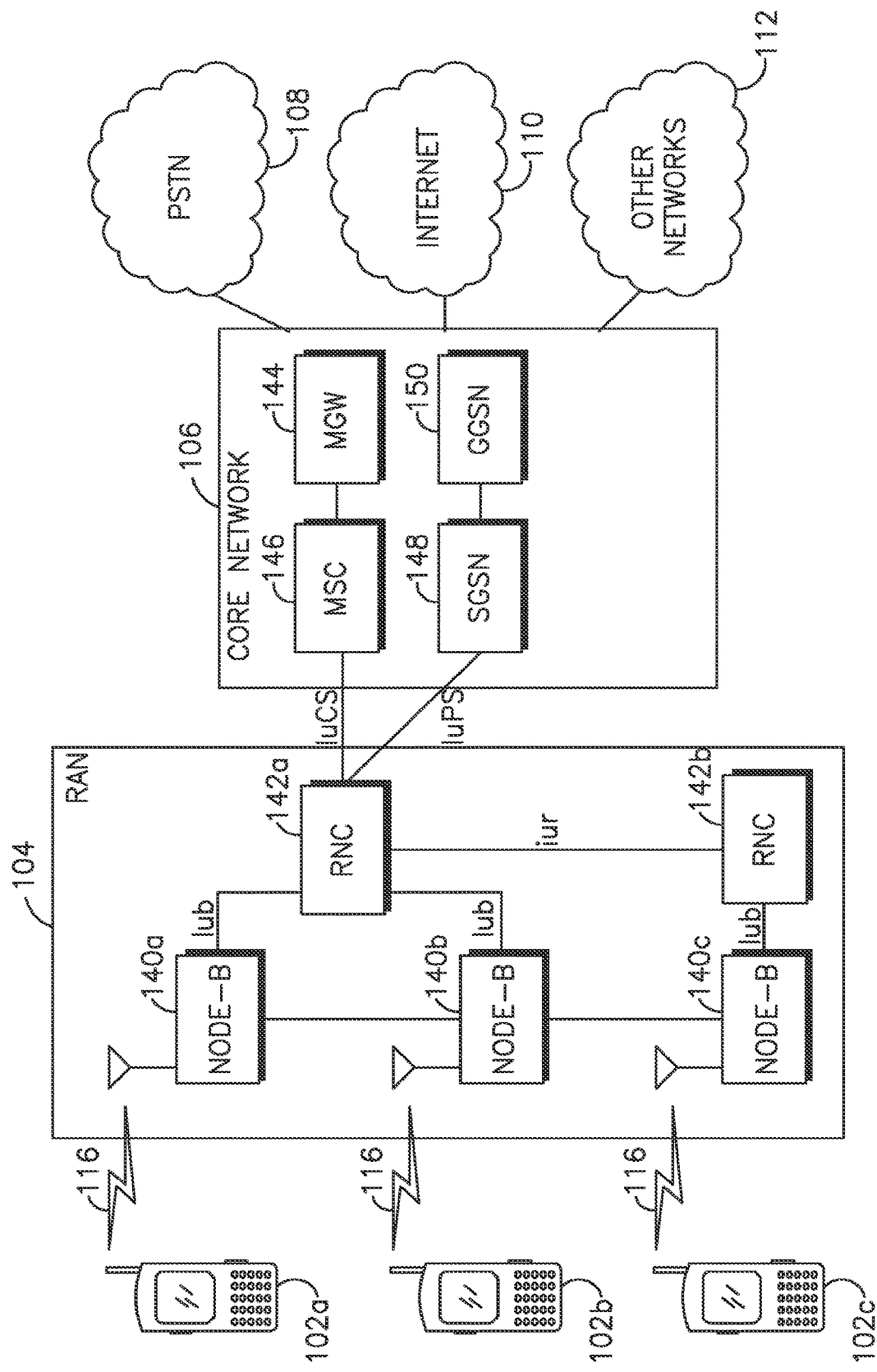
FIG. 1C is a Universal Mobile Telecommunications System (UMTS) system diagram of an example radio access network and an example core network that may be used within the communications system illustrated in FIG. 1A.

FIG. 1C is an example UMTS system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving General Packet Radio Service (GPRS) support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

Figure 1D:
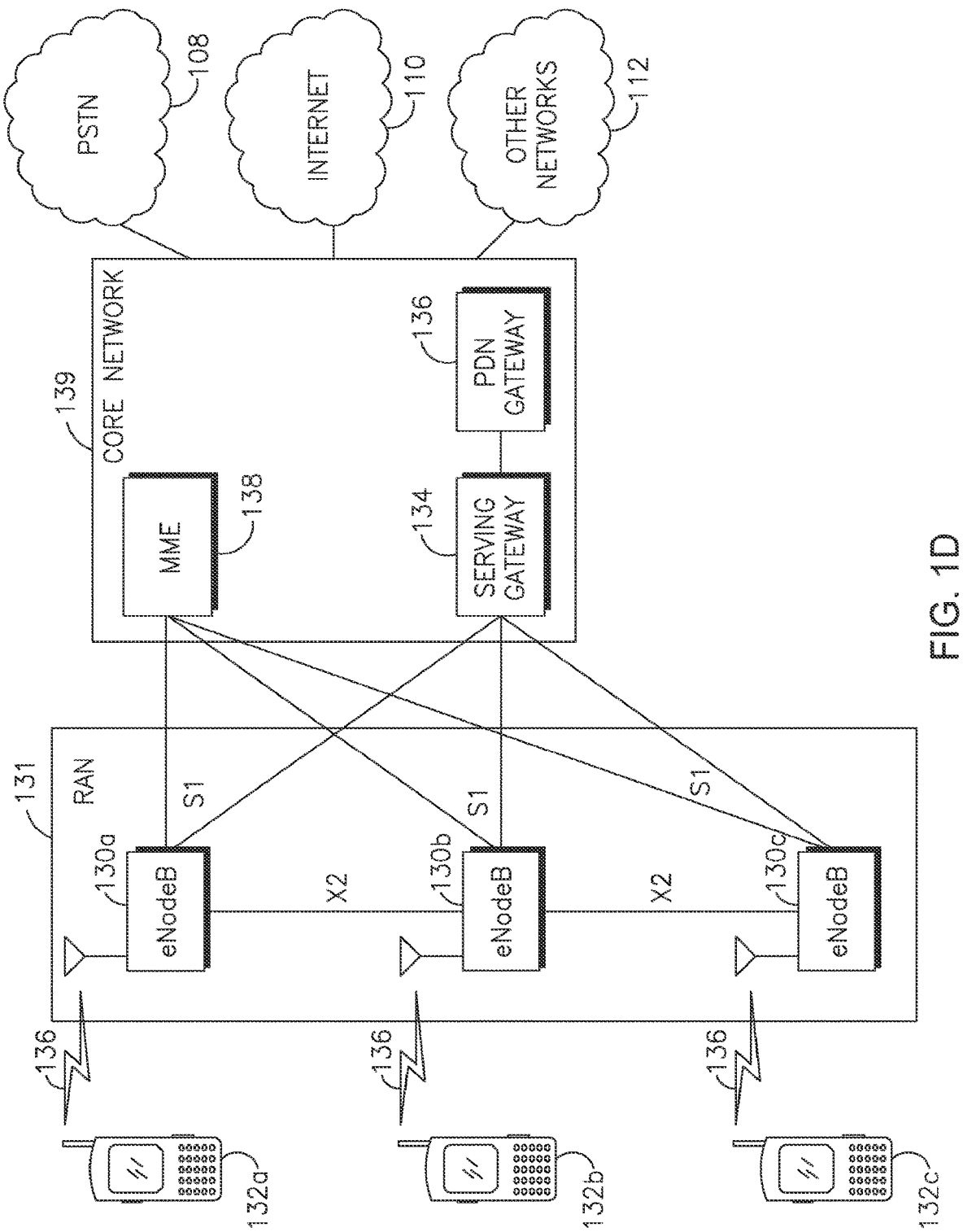
FIG. 1D is a Long Term Evolution (LTE) system diagram of an example radio access network and an example core network that may be used within the communications system illustrated in FIG. 1A.

FIG. 1D is an example LTE system diagram of the RAN 131 and the core network 136 according to an embodiment. As noted above, the RAN 131 may employ an E-UTRA radio technology to communicate with the WTRUs 132*a*, 132*b*, 132*c* over the air interface 136. The RAN 131 may also be in communication with the core network 139.

The RAN 131 may include eNode-Bs 130*a*, 130*b*, 130*c*, though it will be appreciated that the RAN 131 may include any number of eNode-Bs while remaining consistent with an embodiment. The eNode-Bs 130*a*, 130*b*, 130*c* may each include one or more transceivers for communicating with the WTRUs 132*a*, 132*b*, 132*c* over the air interface 116. In one embodiment, the eNode-Bs 130*a*, 130*b*, 130*c* may implement MIMO technology. Thus, the eNode-B 130*a*, for example, may use multiple antennas to transmit wireless signals to, and receive wireless signals from, the WTRU 132*a*.

Each of the eNode-Bs 130*a*, 130*b*, 130*c* may be associated with a particular cell (not shown) and may be configured to handle radio resource management decisions, handover decisions, scheduling of users in the uplink and/or downlink, and the like. As shown in FIG. 1D, the eNode-Bs 130*a*, 130*b*, 130*c* may communicate with one another over an X2 interface.

The core network 139 shown in FIG. 1D may include a mobility management entity gateway (MME) 138, a serving gateway 134, and a packet data network (PDN) gateway 136. While each of the foregoing elements are depicted as part of the core network 139, it will be appreciated that any one of these elements may be owned and/or operated by an entity other than the core network operator.

The MME 138 may be connected to each of the eNode-Bs 130*a*, 130*b*, 130*c* in the RAN 131 via an S1 interface and may serve as a control node. For example, the MME 138 may be responsible for authenticating users of the WTRUs 132*a*, 132*b*, 132*c*, bearer activation/deactivation, selecting a particular serving gateway during an initial attach of the WTRUs 132*a*, 132*b*, 132*c*, and the like. The MME 138 may also provide a control plane function for switching between the RAN 131 and other RANs (not shown) that employ other radio technologies, such as GSM or WCDMA.

The serving gateway 134 may be connected to each of the eNode Bs 130*a*, 130*b*, 130*c* in the RAN 131 via the S1 interface. The serving gateway 134 may generally route and forward user data packets to/from the WTRUs 132*a*, 132*b*, 132*c*. The serving gateway 134 may also perform other functions, such as anchoring user planes during inter-eNode B handovers, triggering paging when downlink data is available for the WTRUs 132*a*, 132*b*, 132*c*, managing and storing contexts of the WTRUs 132*a*, 132*b*, 132*c*, and the like.

The serving gateway 134 may also be connected to the PDN gateway 136, which may provide the WTRUs 132*a*, 132*b*, 132*c* with access to packet-switched networks, such as the Internet 110, to facilitate communications between the WTRUs 132*a*, 132*b*, 132*c* and IP-enabled devices.

The core network 139 may facilitate communications with other networks. For example, the core network 139 may provide the WTRUs 132*a*, 132*b*, 132*c* with access to circuit-switched networks, such as the PSTN 108, to facilitate communications between the WTRUs 132*a*, 132*b*, 132*c* and traditional land-line communications devices. For example, the core network 139 may include, or may communicate with, an IP gateway (e.g., an IP multimedia subsystem (IMS) server) that serves as an interface between the core network 139 and the PSTN 108. In addition, the core network 139 may provide the WTRUs 132*a*, 132*b*, 132*c* with access to the networks 112, which may include other wired or wireless networks that are owned and/or operated by other service providers.

Embodiments shown hereinafter may be directed to LTE-based systems, such as the example LTE diagram shown in FIG. 1D, however one should recognize the disclosure is not limited to LTE and may be equally applicable to a UMTS (UTRAN) and GPRS (GERAN) based systems.

Furthermore, WiFi may be described as a non-3GPP access for offloading purposes, however the disclosed embodiments are not limited to the use of WiFi only and may be equally applicable to other non-3GPP accesses.

Figure 2:
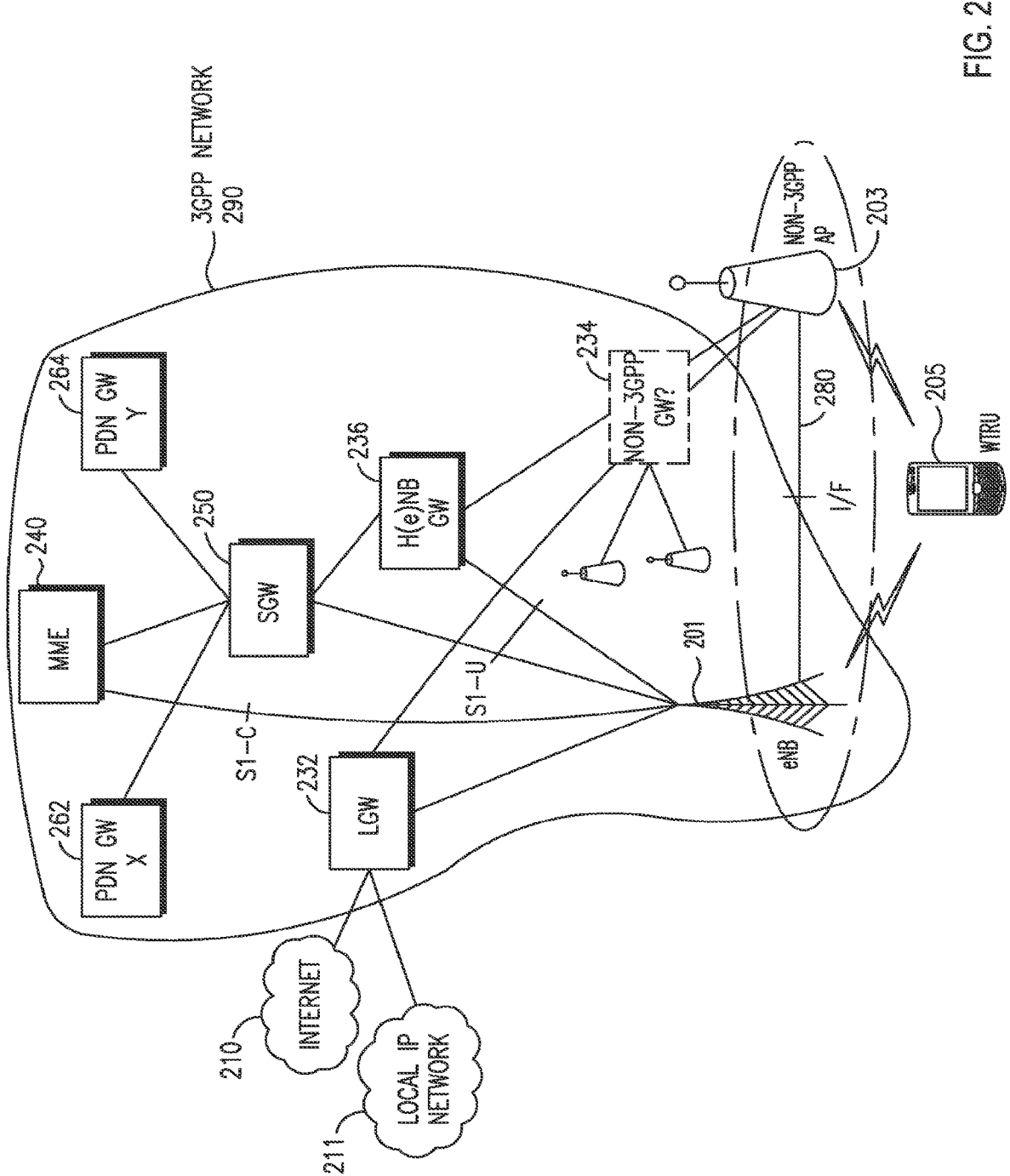
FIG. 2 is a diagram of an example network architecture including 3GPP access network entities, non-3GPP access point (AP), and associated interfaces.

FIG. 2 depicts an embodiment of a new architecture and associated interfaces for supporting offloading between a 3GPP access network and non-3GPP access network. FIG. 2 depicts various 3GPP access network entities each equipped with any of a processor, a transmitter, a receiver, and a storage for processing data and communicating with other entities and WTRUs. In FIG. 2, eNB 201, local gateway (LGW) 232, MME 240, serving gateway (SGW) 250, H(e) NB GW 236, PDN GW X 262 and PDN GW Y 264 are examples of 3GPP access network entities. The non-3GPP access point (AP) 203 is an example of a non-3GPP access network entity and may be similarly equipped with any of a processor, a transmitter, a receiver, and a storage for processing data and communicating with other entities and WTRUs.

FIG. 2 depicts an eNB 201 which may be connected with a LGW 232, an MME 240 via an S1-C interface, a SGW 250 via an S1-U interface, an H(e)NB GW 236 via an S1-U interface, and a non-3GPP access point (AP) 203 via an interface (I/F) 280. Alternatively, the I/F 280 may not be present to directly connect the eNB 201 to the non-3GPP AP 203. The LGW 232 may act as a gateway to internet 210 and/or to a local IP network 211. In addition to a connection with the eNB 201, the non-3GPP AP 203 may be connected with the LGW 232 directly and the H(e)NB GW 236 via I/F 270. A set of non-3GPP APs may be connected with a non-3GPP GW 234 which may be connected to the LGW 232 and the H(e)NB GW 236. The H(e)NB GW 236 may be further connected with the SGW 250. The SGW 250 may be further connected with one or more PDN GWs such as PDN GW X 262 and PDN GW Y 264, and may be connected with MME 240. One or more WTRUs, such as WTRU 205, may be in communication with one or both of eNB 201 and non-3GPP AP 203.

Existing S1 control plane, such as the S1-C between MME 240 and eNB 201 or S1-C via H(e)NB GW 236, may be upgraded to include support for the MME 240 to interact with the non-3GPP AP 203. For example, the S1 control plane may be upgraded with new procedures, messages, information elements (IEs), etc. to support mobility management functions including bearer management. The eNB 201 may provide the control plane (toward the WTRU 205 and the 3GPP network 290) to the non-3GPP AP 203.

The eNB 201 may act as a proxy between the MME 240 and the non-3GPP AP 203. Acting as a proxy may include processing/translating of all or a subset of S1-AP messages into instructions that can be understood by the non-3GPP AP 203, thus minimally impacting the specification of the non-3GPP AP 203.

Though FIG. 2 may depict an example 3GPP LTE system and LTE-based network elements, the embodiment may not be limited to LTE-based systems and may be equally applicable to other 3GPP systems such as UMTS (UTRAN) and GPRS (GERAN).

In conjunction with any of the embodiments disclosed herein, subscription information may be modified to include offloading information. A user profile may be modified to include information indicating whether traffic may be subject to offloading. The offloading may be from a 3GPP access, such as E-UTRAN, to a non-3GPP access, such as WiFi. The subscription information may be stored, for example, in the home subscriber server (HSS) or any other appropriate network entity.

A first example of offloading information that may be included in subscription information may be whether a user's traffic is subject to offloading between 3GPP and non-3GPP access.

Figure 3:
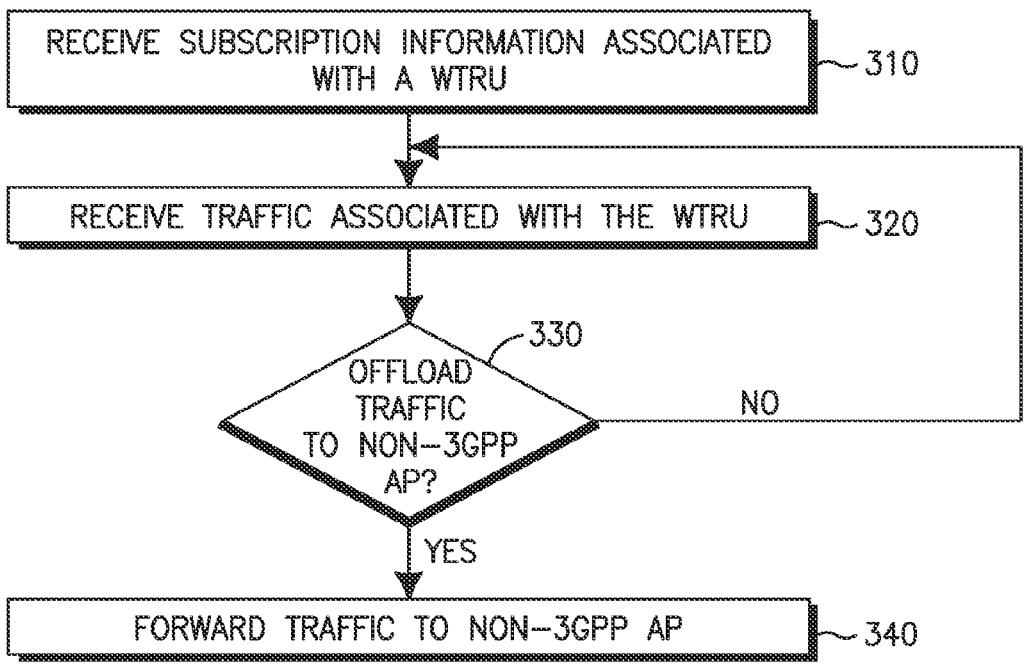
FIG. 3 is a flow diagram of an example offloading procedure.

FIG. 3 depicts an example of non-3GPP offloading 300. First subscription information may be received associated with the WTRU, as depicted in in step 310. The subscription information may be received by a 3GPP access network entity, for example an eNB, MME, (H)eNB, etc. At step 320, traffic associated with the WTRU may be received by a network entity. For example, the traffic may be downlink traffic intended for the WTRU. At step 330, the network entity may determine whether the traffic is subject to offloading. If the traffic is subject to offloading, the network entity may decide to forward the traffic to a non-3GPP AP. At step 340, the traffic may be forwarded to the non-3GPP AP.

Figure 4:
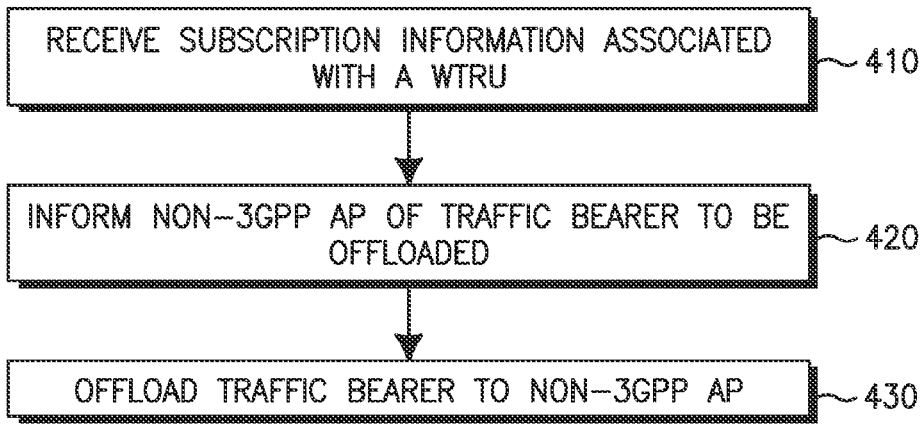
FIG. 4 is a flow diagram of another example offloading procedure.

FIG. 4 depicts another example of non-3GPP offloading 400. This example may be a simplified view of offloading uplink traffic from a WTRU. First subscription information may be received associated with the WTRU, as depicted in in step 410. The subscription information may be received by a 3GPP access network entity, for example an eNB, MME, (H)eNB, etc. The 3GPP network entity may exchange signaling with the WTRU to offload a traffic bearer to a non-3GPP AP in accordance with the subscription information. At step 420, the 3GPP network entity may inform the non-3GPP AP of the traffic bearer to be offloaded in accordance with the subscription information. At step 430, the traffic bearer may be offloaded by the WTRU to the non-3GPP AP. As such, the 3GPP RAN may be freed from receiving the traffic bearer at an appropriate RAN node, such as an eNB.

By way of example, traffic subject to offloading may be identified by a quality of service (QoS), QoS class indicator (QCI), application type, access point name (APN), subscriber profile ID (SPID), etc. associated with the traffic. In one embodiment, all traffic except voice traffic may be identified in the subscription information as being subject to offloading. In another embodiment, voice call, except emergency voice calls, may be identified in the subscription information as being subject to offloading. In yet another embodiment, background traffic may be identified in the subscription information as being subject to offloading. It should be further recognized that any one or any combination of the embodiments may be included in the subscription information.

A user's subscription information may further include information indicating a type of traffic, such as local IP access (LIPA) and/or selected IP traffic offload (SIPTO) traffic, which may be offloaded at a local network.

A user's subscription information may further include information indicating whether the user's traffic is subject to offloading when the WTRU associated with the user is connected to a hybrid cell for which it is not a member.

A user's subscription information may further include information indicating that the default bearer is subject to offload.

A user's subscription information may further include information indicating that dedicated bearers are subject to offload. The user's subscription information may further include information indicating that only dedicated bearers are subject to offload.

A user's subscription information may further include information indicating one or more direction subject to offloading. For instance, the user's subscription information may indicate whether traffic may be subject to offloading from a 3GPP access to a non-3GPP access and/or whether traffic may be subject to offloading from a non-3GPP access to a 3GPP access. For example, a user may pay a premium to have his voice service on a 3GPP access while other services are on WiFi access. In an example scenario, the WiFi traffic may be upgraded or handed off to 3GPP access when the 3GPP radio conditions are good and/or when the network load is such that the network may grant access.

In another example, a user's subscription information may further include information indicating non-voice calls may be on non-3GPP access by default and voice calls may be on 3GPP access with an exception that the user can dynamically grant permission to offload his 3GPP traffic to a non-3GPP access. In such a scenario, a user may pay a premium to always have his voice calls on a 3GPP access by default unless the user grants permission to offload to non-3GPP access. Furthermore, the user may have non-voice traffic on non-3GPP access by default and may pay a premium to offload the non-voice traffic to 3GPP access. Alternatively, the user may receive complimentary service or reward service to upgrade traffic from non-3GPP access to 3GPP access.

A user's subscription information may further include information indicating whether the user has the option to accept or reject non-3GPP offloading. For example, a user's consent may be obtained each time there is a decision to start or stop non-3GPP offload. Decisions to perform offloading may be done by any layer in the 3GPP system, for instance non-access stratum (NAS) and/or radio resource control (RRC), and may be either locally in the WTRU or in a network entity, such as an MME or eNB. A user's consent may be indicated and available in the subscription information upon subscription purchase. For instance, the user's subscription may indicate consent to use WiFi offload. Further, the user's subscription may further indicate a subset of traffic or traffic type that may be offloaded, such as traffic with a particular QoS, QCI, application type, etc.

A user's subscription information may further include information indicating which types of traffic are always mapped to 3GPP access and which types of traffic are always mapped to non-3GPP access.

A user's subscription information may further include information indicating whether offloading is applicable on an indicated cell or type of cell, for instance a closed subscriber group (CSG) cell, a local network with a specific local network identity, or a tracking area, etc.

A user's subscription information may further include information indicating whether offloading is applicable during one or more specified time of day. The subscription information may further indicate whether offloading is preferred during the one or more specified time of day.

Upon a WTRU's registration to the network, the HSS may provide the subscription information to the MME. The MME may also provide the subscription information to the radio access network (RAN), for instance the eNB serving the WTRU. The HSS may provide the subscription information in one or more S1AP message. The information provided to the RAN may include of the information or combination of the information disclosed above. Subscription information may also be forwarded between network elements during handovers, such as inter-MME handover as part of a transferred UE context or when a source MME/SGSN hands over to another system node such as another MME/SGSN.

Support for offloading of traffic between non-3GPP and 3GPP accesses may include passing of information among 3GPP network elements. For example, in an embodiment including an E-UTRA, the MME may inform the RAN, such as the eNB, that a WTRU's traffic is subject to offloading. The MME may further specify on a per bearer basis whether the bearer is subject to offloading. The MME may inform the eNB during the setup of a UE context. Alternatively or additionally, the MME may indicate whether a new bearer is subject to offload during the establishment of the new bearer.

In an embodiment, the MME may indicate whether or not the WTRU's traffic is subject to offloading. The MME may indicate to an eNB via a S1AP message, which may contain a bit, flag, or information element, indicating that the WTRU's traffic may be subject to offloading based on user subscription information. The eNB may use the received indication to decide which traffic or bearer to offload to a non-3GPP system. The MME may provide an indication to the eNB on a per bearer basis. Thus, the MME may inform the eNB whether or not each and every bearer is subject to offloading.

In another embodiment, the MME may indicate to the eNB which QCI may be subject to offloading. Additionally or alternatively, the MME may indicate to the eNB which bearer or set of bearers matching a particular QoS are subject to offloading. Additionally or alternatively, the MME may indicate to the eNB a minimum QoS, a maximum QoS, or a range of QoS of a bearer or set of bearers that may be subject to offloading. For example, the MME may indicate that any bearer with a QoS particular value may be subject to offloading. Thus, the eNB may then decide when to offload a bearer over a non-3GPP access, such as WiFi, if the associated QoS of the bearer is the particular value.

In yet another embodiment, the MME may indicate to the eNB that traffic associated with a correlation ID should be offloaded. The correlation ID may be present in a S1AP message. For example, the MME may indicate that LIPA and/or SIPTO at the local network (SIPTO@LN) should be offloaded. The eNB may use this indication along with the correlation ID to identify a bearer that may be subject to offloading. For example, during a setup of a UE context at an eNB, the MME may include a correlation ID to indicate that a bearer is for LIPA (or SIPTO@LN). The MME may also indicate the bearer is subject to offloading. The eNB may then use both indications to identify the bearer that is subject to offload and may then decide to offload at least that bearer over a non-3GPP access, e.g. WiFi.

The MME may pass any information to the eNB that may enable the eNB to decide which traffic to offload. The MME may provide the eNB with subscription information or any other indication that may enable the eNB to make offloading decisions based on the user's subscription information.

In yet another embodiment, the MME may also indicate a layer at which an offload should be done. For instance, the MME may indicate whether the offload should be done at the IP layer, the packet data convergence protocol (PDCP) layer, and/or the radio link control (RLC) layer, etc.

In yet another embodiment, the MME may indicate to the eNB a direction or path for the offloaded traffic from the non-3GPP access. For instance, the MME may indicate to the eNB that LIPA/SIPTO@LN traffic may go directly from the non-3GPP AP to the LGW. The indication may include an address or any other identifier of the entity to which the traffic should be forwarded. The non-3GPP AP may connect with the indicated entity and exchange data directly with the entity. As such, the eNB may configure the non-3GPP AP, such as a WiFi AP, to forward traffic in accordance with the indications sent by the eNB.

Figure 5:
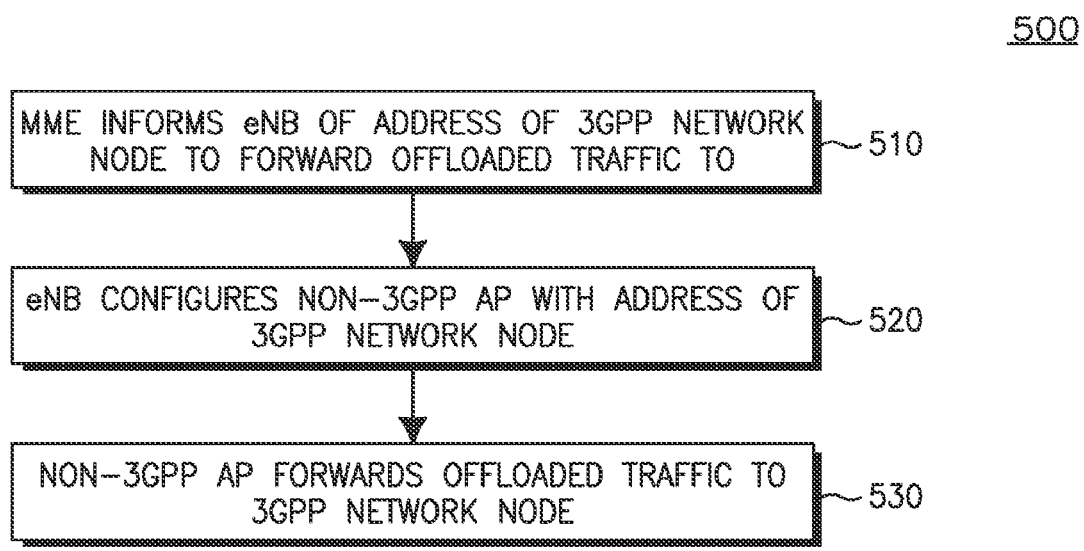
FIG. 5 is a flow diagram of another example offloading procedure.

FIG. 5 depicts an embodiment of offloading procedures 500. At step 510, the MME may inform the eNB of an address of a 3GPP network node to forward offloaded traffic to. At step 520, the eNB may configure a non-3GPP AP with the address of the 3GPP network node so that the non-3GPP AP may forward the offloaded traffic directly to the 3GPP network node specified by the address. For example, the address may be that of a LGW and the non-3GPP AP may forward the offloaded traffic directly to the LGW instead of the eNB. At step 530, the non-3GPP AP forwards the offloaded traffic directly to the 3GPP node, for instance the LGW, specified by the configured address.

In another embodiment, the MME may indicate to the eNB whether uplink, downlink, or both directions of traffic may be subject to offloading. The eNB and/or the WTRU may be configured with such information.

In another embodiment, the MME may indicate offloading applicability based on location or connection information. For instance, a location may be indicated by a particular tracking area in which the WTRU's traffic may or may not be subject to offloading. In another example, the MME may indicate offloading may or may not be applicable when the WTRU is connected to a local network. In another example, the MME may indicate offloading may or may not be applicable when the WTRU is in a particular cell, for instance in a CSG. Such offloading information may be stored in the HSS and provided to the MME which may provide the information to the eNB. In yet another example, the MME may provide offloading information to a source eNB which may indicate a offloading is applicable in a target eNB. The source eNB may provide the offloading information to the target eNB. Additionally or alternatively the MME may provide the offloading information directly to the target eNB. The MME may inform the target eNB during or after handover. For instance, the MME may inform the target eNB via one or more handover preparation messages for S1 and/or X2 handovers.

In another embodiment, the MME may also indicate a time during which offload may or may not be allowed. For instance, during peak times, the MME may indicate offloading is allowed from the 3GPP RAN to the non-3GPP access. Additionally or alternatively, the MME may indicate a preference to offload during peak times.

The eNB may use information and indications provided by the MME to decide which traffic to offload, when to offload traffic, to which non-3GPP access to offload the traffic, and/or to which network entity the chosen non-3GPP access should forward traffic to. For example, the eNB may use indications provided by the MME to start or to stop offload to/from a non-3GPP access. Further by way of example, the eNB may receive an indication from an MME that a WTRU's traffic with a QCI X is subject to offload. Any time when a bearer with a QCI X for the WTRU's traffic is created, the eNB can decide to offload the bearer. For instance, bearers used for voice calls may not be subject to offload in order to guarantee a good service level because the 3GPP RAN may be able to provide some minimum/guaranteed level of service. The non-3GPP access, for instance WiFi, may not be able to guarantee the radio service quality.

In another embodiment, the MME may indicate to the eNB that LIPA and/or SIPTO may be subject to non-3GPP offload. As such, the eNB may use any indication that the traffic is LIPA and/or SIPTO, for instance a correlation ID, to decide to offload the traffic to the non-3GPP access.

In another embodiment, for each radio access bearer (RAB) to be set up, for instance an E-UTRA RAB (E-RAB), the MME may signal to the eNB an E-RAB ID, e-RAB level QoS parameters, etc. and may send signal an indication whether the E-RAB is mapped to a 3GPP access or a non-3GPP access. The MME may signal the E-RAB is mapped to 3GPP access by default. The MME may signal the mapping of the E-RAB based on subscription information stored in the HSS.

In yet another embodiment, during PDN connection establishment, during dedicated bearer establishment, or during the WTRU transferring from EMM-IDLE state to EMM-CONNECTED state, or during a handover procedure, the eNB may establish resources towards the non-3GPP access, for instance WiFi, for bearers which may be mapped to non-3GPP access. The eNB may do so based on indications received from the MME which may be further based on a subscription profile stored in the HSS. Some bearers may be subject to non-3GPP access while others may not. The 3GPP access, possibly via the eNB, may indicate to the non-3GPP access further information such as whether bearers carrying uplink, downlink, or both directions are subject to offload, as described in more detail above.

It should be recognized that the embodiments described above are not limited to interactions between the MME and eNB. One should recognize that all embodiments may be equally applicable to interactions between the MME and HeNB GW. Hence, the MME may indicate offloading information to the HeNB GW additionally or in lieu of sending indications to the eNB.

By way of example, in combination with any of the disclosed embodiments, the eNB may decide to offload traffic based on indications received from an MME. The indications received from the MME may be based on user subscription information. The user subscription information may be stored in a user profile in an HSS. Thus, the MME may provide the eNB (or HeNB GW) with sufficient information to enable the eNB to decide which traffic or traffic bearers can be offloaded to a non-3GPP access, such as WiFi. For example, the MME may provide indications of bearers subject to offload to the eNB via new information elements or a bitmap. In such a manner, a bearer may be mapped to a bit of the example bitmap such that a value of the bit may indicate that the corresponding bearer is subject to offload.

The 3GPP network, via the MME, eNB, or both, may also send offloading indications to the WTRU. The MME may communicate with the WTRU using NAS messages to indicate offloading information, while the eNB may communicate with the WTRU using RRC messages to indicate offloading information. The RRC messages may be broadcast or dedicated. It should be understood that the 3GPP network may refer to the MME, the eNB, or both.

In an embodiment, the 3GPP network may inform the WTRU which bearers may be offloaded to a non-3GPP access. Furthermore, selected flows within a bearer may be offloaded and others may not be offloaded. The 3GPP network may also indicate the set of flows, per bearer, that may be offloaded to the non-3GPP access. Alternatively or additionally, the network can inform the WTRU which bearers are no longer subject to offload and may provide a cause code to describe the reason for such notification. For example, even though a user may manually select to use WiFi for a selected application, the network may reject the user's request based on the fact that WiFi may not provide a guaranteed minimum QoS to match the requirements of the associated bearer. Thus, the WTRU, based on the received cause code, may either display an appropriate message to the user so that the user understands the reason for not meeting the user's request. Alternatively or additionally, the WTRU may stop sending requests to start/stop WiFi offload. The WTRU may stop sending requests for a network specified time or for a preconfigured time at the WTRU.

In another embodiment, the 3GPP network may indicate whether offloading is available in the downlink only, in the uplink only, or in both the uplink and the downlink.

In another embodiment, the 3GPP network may indicate the type of traffic that may be subject to offload. For instance, the 3GPP network may indicate an application type, QoS type, QCI value, or any other traffic characteristic.

In another embodiment, the 3GPP network may inform the WTRU that non-3GPP offloading may not be applicable. The 3GPP network may further indicate offloading may not be available for a specific time period. This may be, for example, due to an error or malfunction of the non-3GPP AP or a malfunction of the eNB-non-3GPP AP interaction, or due to an error in the eNB. As such, the WTRU may not request offloading over non-3GPP access during this time unless, for example, the WTRU receives an explicit indication to stop non-3GPP offloading. While non-3GPP offloading is unavailable, the WTRU may, for example, send data over an alternative access that is available, such as the LTE access. The WTRU may continue to send data over the LTE access until the WTRU receives an explicit indication to use the non-3GPP access, e.g. WiFi, for some or all traffic. Further, while the non-3GPP access is unavailable, the WTRU may display a message to the user to indicate the unavailability of the non-3GPP access (or non-3GPP access offloading) even if the non-3G-PP AP is detected from a radio perspective. Further, during the indicated time that the non-3GPP access is unavailable, the WTRU may also stop sending offload requests even if the user manually selects offloading.

In another embodiment, the 3GPP network may signal or request the WTRU to switch on the non-3GPP radio. The 3GPP network may signal the WTRU to turn on the non-3GPP, e.g. WiFi, radio when the non-3GPP radio is off and the network is attempting to offload traffic to the non-3GPP access for the WTRU. The eNB may send an RRC message, for example, to request the WTRU to report if its WiFi access, or other non-3GPP access, is ON or OFF. The WTRU may respond with an RRC message to indicate the status of the non-3GPP access network, for example whether the WiFi access is ON or OFF. Alternatively or additionally, the MME may message the WTRU via a NAS message. The WTRU may respond to the MME accordingly. The WTRU may also, for example, indicate the status of its non-3GPP access radio upon establishing an RRC connection. By way of example, this may be done by including a bit in any message that is part of the random access procedure. Also, the WTRU may include the status of its non-3GPP access radio in the RRC Connection Setup Complete or any equivalent message in UTRAN.

In another embodiment, the 3GPP network may send the available non-3GPP connection parameters to the WTRU. These parameters may be sent upon request before establishing the connection for non-3GPP offload. For example, for WiFi offload, these parameters may include but are not limited to any one or any combination of the following: BSSID/SSID of the network, beacon interval, type of WiFi available e.g. 802.11a, 802.11b/g/n etc., frequency band of the WiFi, operating channel number, WEP/WPA or any other security key that may be required, operating bandwidth e.g. 5 MHz, 10 MHz, 20 MHz or 40 MHz etc.

In general, the 3GPP network may pass to the WTRU any of the subscription information disclosed herein. For example, during PDN connection establishment, dedicated bearer establishment, the WTRU state transfer from EMM-IDLE to EMM-CONNECTED, or during a handover procedure, the 3GPP network may inform the WTRU of the default mapping of the bearers, i.e. which bearers are mapped to the 3GPP access and which bearers are mapped to the non-3GPP access. Furthermore, the 3GPP network may indicate the allowed offload directions, e.g. uplink, downlink, or both, to the WTRU.

In yet another embodiment, the WTRU may send offloading indications to the 3GPP network. It is understood that the WTRU can send NAS messages to the MME if it is communicating with the MME, and the WTRU can use RRC messages if it is communicating with the eNB. Thus, in general "WTRU communicates or sends a message to the 3GPP network" should be interpreted as WTRU communication with the MME and/or the eNB using NAS and/or RRC messages, respectively.

In another embodiment, the WTRU may inform the 3GPP network whether the WTRU or user wants to start or to stop the use of non-3GPP offload.

In another embodiment, the user may explicitly choose to stop or start non-3GPP offload via the user interface. Hence, the WTRU may communicate the user's choice for non-3GPP offload to the 3GPP network.

The WTRU may communicate a selected application, and may also indicate the bearer that is used by this application, that may be offloaded. Offloading configuration may be based on WTRU preferences, such as preconfigurations in the WTRU via access network discovery and selection function (ANDSF), Open Mobile Alliance (OMA) device management (DM), SIM over-the-air (OTA), etc. The offloading configuration may be alternatively or additionally based on user selection of which application should run on a non-3GPP access vs. 3GPP access. For example, the user may select WiFi access for LIPA/SIPTO@LN traffic.

In another embodiment, the WTRU may optionally indicate to the 3GPP network which type of application is subject to offload or which kind of content is subject to offload. Hence, the eNB may use this information to decide what type of application or type of content transmitted or received by those applications to offload. For example, the WTRU may indicate that any application with a specific application ID may be subject to offload. Thus, at any point in time, the eNB may receive an application ID and may decide to offload a bearer or a flow to a non-3GPP access associated with the application ID. Alternatively or additionally, the eNB may perform deep packet inspection to determine whether the traffic is associated with a particular application or whether the traffic is of a particular type specified for offloading. The WTRU may indicate to the eNB that the bearer with particular user data content should be offloaded. The WTRU may send a certain content ID, explicitly indicate the type of the content being sent on a particular bearer, or provide description of contents that are subject to offload. Additionally or alternatively, the WTRU may indicate the number of applications and/or the IDs of the applications running on one bearer. Thus, the WTRU may provide the eNB with enough information that may enable the eNB to decide which bearers/packets associated with specific applications or content should be offloaded over a non-3GPP access. The WTRU may provide the indications to the eNB via new information elements, in a bitmap in an RRC message, or via other messages from the WTRU to the eNB.

In another embodiment, the WTRU may indicate to the eNB the maximum number of bearers that may be offloaded to a non-3GPP access, such as WiFi. Based on the WTRU implementation and various other factors, different WTRUs may have a different maximum number of bearers, which may be offloaded to the non-3GPP access. The maximum number of bearers may be preset by the WTRU vendor/configuration/USIM or it may be dynamic based on various factors including but not limited to the traffic type, power savings, whether LIPA PDN connection is active or not, or WTRU access class. Such information may also be provided by the MME to the eNB.

In another embodiment, the WTRU may signal the network to stop using a non-3GPP offload when the WTRU's battery level drops below a certain threshold. The WTRU may measure the battery level and determine a threshold below which non-3GPP offloading should cease. Alternatively or additionally, the WTRU may indicate its battery level or power level status to the eNB or whether or not the WTRU is connected to an external power source. This information may be used by the eNB to decide whether the traffic should be offloaded over a non-3GPP access or not. For example, if the WTRU indicates a low battery power level to the 3GPP network, the 3GPP network may decide to not offload the WTRU's traffic to WiFi since it may drain battery levels more quickly using two radios at the same time instead of just a 3GPP radio. Alternatively or additional, if the WTRU indicates a high battery level or if the WTRU indicates that it is connected to an external power source, the 3GPP network may decide to offload traffic to the non-3GPP access. Hence the battery level or power status may be used by the eNB to determine the amount of traffic to be offloaded to the non-3GPP access. Alternatively or additionally, the WTRU may operate in a certain power saving mode such that it may want to conserve power. The WTRU may indicate the power saving mode to the eNB so that the eNB offloads no or minimum traffic of the WTRU to the non-3GPP access.

In another embodiment, the WTRU may indicate offloading exceptions. The WTRU may indicate certain types of bearers or certain types of traffic that the WTRU may not want to offload. For example, the WTRU may not want to offload IMS Voice traffic running on the bearer with QCI 1 as it may reduce the quality of voice. As such, the WTRU may indicate this exception to the eNB. Offloading exceptions may be set by the user, preconfigured in the WTRU, set by the operator using a OMA DM procedure, or may be provided by the MME to the eNB.

In another embodiment, the WTRU may indicate the received power level of the WiFi signal to the 3GPP network. The WTRU may send this indication even when there is no ongoing non-3GPP access traffic offload for the WTRU. The received power level information may enable the eNB to communication with the non-3GPP AP in order to set the transmit power level of the non-3GPP AP such that all of the WTRUs in the cell or in a particular location could be able to receive the non-3GPP signals from the non-3GPP AP. The WTRU may be configured by the 3GPP network to send this indication, or the WTRU may send this indication on its own.

In another embodiment, the WTRU may send a buffer status report (BSR) to the 3GPP network. In the BSR, the WTRU may report the amount of data or traffic in the non-3GPP access buffers. This may enable the eNB to optimize scheduling both over the 3GPP and the non-3GPP interface. The eNB may further use the BSR for handover procedures. For example, when the WTRU is being handed over to a cell which does not support WiFi, the eNB may use the BSR to decide to stop offloading to WiFi.

In another embodiment, the WTRU may indicate to a 3GPP network node information about the offloading capability of neighboring network nodes. Such information may be used in support of ANR (Automatic Neighbor Relation) and in the decision making process of whether or not to initiate a direct connection, e.g. a logical connection, between the two network nodes.

Note that for all embodiments described herein, offloading information may be used to either start or stop non-3GPP offloading. For example, the offloading information may be used to start WiFi offloading for a first set of applications, but to stop WiFi offloading for a second set of applications.

In an embodiment, upon reception of offloading indications from a WTRU, the 3GPP network may then start acting based on the WTRU indications. For example, the eNB may be informed by the WTRU to start using WiFi to offload traffic for a specific application or bearer. The eNB may then start the offload of the related traffic over to WiFi. Alternatively or additionally, this information may be sent to the MME by the WTRU. The MME may then inform the eNB over S1AP messages to start or stop the use of WiFi offload according to the information received from the WTRU. Such indications from the MME to the eNB may be implemented as a new S1AP message or by modifying existing messages by adding new information elements to specify the eNB action that should be taken.

In another embodiment, the 3GPP network and non-3GPP AP may also interact to perform offloading. The 3GPP network may refer to the eNB and/or the MME. Also, the non-3GPP AP may refer to any non-3GPP access point, such as a WiFi AP, or to any non-3GPP AP GW, for example WiFi GW 234 in FIG. 2.

The eNB and the non-3GPP AP may have both control and user planes. The control plane between the eNB and non-3GPP AP can be used to manage a connection between the eNB and the non-3GPP AP. The connection may be further managed per user and/or per user per bearer, etc. A user plane between the eNB and non-3GPP AP may be used to forward user plane data between the eNB and the non-3GPP AP. Thus for example, to offload traffic to the non-3GPP AP in the downlink, the eNB may forward downlink WTRU data to the non-3GPP AP over a user plane that may be established between the eNB and the non-3GPP AP. The non-3GPP AP may then transmit the data to the WTRU. Similarly, in the uplink, when the non-3GPP AP receives from the WTRU, the non-3GPP AP may forward the WTRU data to the eNB via the user plane that is established between the non-3GPP AP and the eNB. The eNB then processes the WTRU data accordingly.

In another embodiment, the 3GPP network, e.g. eNB, may indicate information to the non-3GPP AP over, for instance, the control plane of the eNB and the non-3GPP AP. For example, the eNB may indicate to the non-3GPP AP to start forwarding data to a particular WTRU. The eNB may indicate the WTRU's identity to the non-3GPP AP. For instance, the eNB may indicate the WTRU's media access control (MAC) address or any other identity that is known to the non-3GPP AP and is recognized by the non-3GPP and uniquely identifies the WTRU. The eNB may indicate that the offload is in the uplink, in the downlink, or both. Thus, for example, if the eNB indicates that the offload is only in the downlink, the non-3GPP AP may discard any data received from the WTRU in the uplink.

In yet another embodiment, the 3GPP network may inform the non-3GPP AP to stop offloading traffic to a WTRU. The non-3GPP AP may then forward any data that it has received from the WTRU in the uplink to the eNB or forward any data that it has received from the eNB in the downlink to the WTRU. The non-3GPP AP may then discard any packet that is subsequently received from the eNB and/or the WTRU until an explicit indication is received from the 3GPP network to re-start the offload. The non-3GPP AP may still maintain any WTRU association context even if informed not to offload traffic for a WTRU.

In another embodiment, the 3GPP network, e.g. eNB, may inform the non-3GPP AP about a network node to contact for forwarding data. For example, the eNB may indicate to the non-3GPP AP that it should forward (and receive) data from a LGW, a HeNB GW, and/or from the eNB itself. Alternatively or additionally, the 3GPP network may indicate the address of the 3GPP network node. The address of the network node may be for a user plane or for a control plane between the non-3GPP AP and the network node. The 3GPP network may provide more than one address, e.g. one for the user plane and one for the control plane, to the non-3GPP AP. For example, the 3GPP network may decide to offload LIPA traffic over a non-3GPP AP. Thus, when a PDN connection for LIPA traffic is set up or when the WTRU transitions to connected mode and has a LIPA PDN connection, the 3GPP network may decide to offload the LIPA traffic over the non-3GPP AP such that the data path goes directly from the non-3GPP AP to the LGW. Hence, the 3GPP network may inform the non-3GPP AP to setup a connection with the LGW and may also provide at least one address of the LGW. Note that in this example, the 3GPP network may also inform the LGW (or any other involved node) that the LIPA traffic (or any other corresponding traffic) should be directed to the non-3GPP AP. The 3GPP network may also provide the LGW (or any other node) with the non-3GPP AP's address. Alternatively or additionally, the LGW (or any other node) may wait for the non-3GPP AP to contact it for setting up a connection for the WTRU.

In another embodiment, when an eNB decides to offload traffic to a non-3GPP AP, the eNB may establish two different connections. The eNB may establish, for example, a logical u-plane connection between the eNB and the non-3GPP AP and may establish the non-3GPP air interface connection between the non-3GPP AP and the WTRU.

In another embodiment, a message exchange between the eNB and the non-3GPP AP to setup the user plane connection may be different for different types of interfaces between the eNB and the non-3GPP AP. This interface may be based on GPRS tunneling protocol (GTP), IP, or any other transport level protocol. The contents of the messages exchanged on this interface for connection setup may be similar. A connection setup request message may be initiated by the eNB or may be initiated by the non-3GPP AP. Information, which may be included as information elements, that may be sent in a connection setup request message includes but is not limited to the following: a bearer ID of the bearer to be offloaded, a QCI or any other QoS related parameters of the bearer to be offloaded, an identification indication such as an uplink or downlink tunnel endpoint ID (TEID), IP address, or port number, etc., which may enable the non-3GPP AP or eNB to map the data to the correct bearer, WTRU identification information such as temporary mobile subscriber identity (TMSI), cell radio network temporary identity (C-RNTI), MAC address, or Association ID, etc., an indication such as a correlation ID or explicit indication to inform the non-3GPP AP that the particular bearer is, for instance, a LIPA bearer, IP 5 tuple information or traffic flow template information of the traffic being sent on that bearer, and/or the WTRU's uplink packet flow template. The eNB may not locally have IP 5 tuple information or traffic flow template but may get this information from the MME or PDN GW. Further, the WTRU's uplink packet flow template may be provided by the MME via the eNB. The uplink packet flow template may be used by the non-3GPP AP to map UL packets from the WTRU to the appropriate connection between the non-3GPP AP and the eNB, assuming a separate connection per bearer. Thus, the eNB may forward this information to the non-3GPP AP during connection setup.

In another embodiment, when the non-3GPP AP or eNB receives the connection setup request it may reply back with a response message to complete the procedure. This connection setup response message may include one or more of the following information elements: an association ID of the air interface link between the WTRU and the 3GPP AP, an identification indication such as an uplink or downlink tunnel endpoint ID (TEID), IP address, or port number, etc., which may enable the non-3GPP AP or eNB to map the data to the correct bearer, and/or a response type such as success, failure, etc.

In another embodiment, a logical U-plane connection may be created for each bearer that may be offloaded to the non-3GPP AP. When this connection is created the eNB may forward any data that it receives in the DL from the S-GW to the corresponding connection on the eNB-to-non-3GPP AP interface instead of or in conjunction with sending at least a portion of this over the air interface. Similarly in the UL direction, the eNB may receive the packet on the eNB-to-non-3GPP AP interface and may responsively check the EPS bearer ID and may forward the packet on to the corresponding S1-U bearer. Hence there may be a one-to-one mapping between the S1-U tunnel and the logical u-plane eNB-to-non-3GPP AP interface.

In another embodiment, the non-3GPP AP may receive a packet in the DL direction from the eNB and may responsively forward the packet to the WTRU over the non-3GPP air interface. Different logical u-plane eNB-to-non-3GPP AP connections may be mapped to the same non-3GPP air interface since the non-3GPP access may not able to distinguish packets on a per bearer basis. Therefore multiple bearer IDs or similar IDs for the eNB-to-non-3GPP logical u-plane connection may be mapped to a single non-3GPP WTRU ID such as an association ID, MAC address, etc. When the non-3GPP AP receives data on from the eNB, the non-3GPP AP can forward the data to the corresponding WTRU based on this mapping between the bearer and the WTRU ID.

In the uplink direction, when the non-3GPP AP receives a packet on the air interface it may use the Traffic Flow Template (TFTs) it may receive during the connection setup procedure to map the incoming packets to the appropriate bearer. The incoming packets may go through a filtering procedure based on the IP characteristics of the packets and the parameters in the TFTs or packet filters. This procedure may filter the packet to the corresponding logical u-plane eNB-to-non-3GPP connection and hence from there may be sent to the PDN GW on the correct S1-U bearer since there may be a one to one mapping between this connection and the S1-U bearer.

In another embodiment, as shown by example in FIG. 2, the HeNB GW 236 may be directly connected to at least one non-3GPP AP 203. The HeNB GW 236 may also make decisions for offloading traffic over the non-3GPP AP 203. The 3GPP network, such as the MME 240 may provide the HeNB GW 236 with policies or indications for offload of a WTRU's traffic over a non-3GPP AP 203 as disclosed herein above with respect to the MME 240 providing such information and policies to the eNB 201. Thus, the HeNB GW 236 may store and use any of the offload indications and information described with respect to the eNB 201 above.

In another embodiment, the HeNB GW 236 may connect to at least one non-3GPP AP 203 and hence may store information about the non-3GPP APs that it connects to and the address of each non-3GPP AP. The HeNB GW 236 may additionally or alternatively store an address for control plane and an address for user plane and may store each address per WTRU. The HeNB GW 236 may also store or contain information about the HeNBs 201 that connect to a non-3GPP AP 203 and the address of each non-3GPP AP 203, or both user and/or control plane addresses as described above.

Though descriptions contained herein may use the term "eNB," the term is not restricted to an eNB and may further include a HeNB, a HeNB GW, or all of them.

In another embodiment, the eNB may inform the MME about any connections the eNB may have to at least one non-3GPP AP. The eNB may provide the identity of the non-3GPP AP, such as by providing the MAC address of the non-3GPP AP, the eNB may provide the address of the non-3GPP AP, the eNB may provide a list of addresses that may refer a tunnel endpoint ID for a user or control plane, and/or the eNB may provide any other address that may be used by any other entity in the network to contact the non-3GPP AP for user and/or control plane.

In another embodiment, the eNB may include the information about its connections to non-3GPP APs in any S1AP message that is sent from the eNB to the MME. For example, the eNB may include this information when sending the WTRU's initial NAS message using the S1AP Initial WTRU Message. The information may be included in the message as a new IE.

In another embodiment, the eNB may inform the MME when offload may not be possible, for instance due to an internal problem with the non-3GPP AP or any other problem. The eNB may inform the MME via an S1AP message. The eNB may provide a cause code to explain the reason for the error. For example, a new cause code such as "temporary error" may be used to describe an internal error in the non-3GPP AP or in the interface between the non-3GPP AP and the eNB. The eNB may send a S1AP message to indicate to the MME that WiFi offload is not possible, for instance in the above example, after a previous indication that offload was temporarily not available.

In another embodiment, the MME may store information about which eNB connects to at least one non-3GPP AP and should also keep an indication about whether or not offload is possible in the eNB. The indications of whether or not offload is possible may be based on indications from the eNB. For example, if an eNB indicates that offload is not available, for instance due to an error, the MME may not request the eNB to offload WTRU traffic over a non-3GPP AP until the eNB indicates that non-3GPP offload is possible.

In another embodiment, the non-3GPP AP may indicate one or more errors to the eNB. The eNB may then inform the MME about the one or more errors. The MME may inform other nodes, such as the HeNB GW, LGW, WTRU, etc., to stop offloading. For example, the MME may send a message to stop offloading for one or more WTRUs that are already offloading traffic, or for one or more WTRUs for which offload is requested. Additionally or alternatively, the eNB may inform other nodes, such as the HeNB GW, LGW, WTRU, etc., to stop offloading.

In another embodiment, the eNB may indicate to the WTRU via RRC messaging that offload should be stopped in the uplink or may indicate to the WTRU to stop expecting offload in the downlink. The eNB may indicate a cause code to specify that a reason for halting offloading, for example due to an internal non-3GPP AP error. This can be done for WTRUs that may be already offloading traffic or for WTRUs that may be requesting offload over a non-3GPP AP. The MME may also inform the WTRU via one or more NAS messages. The eNB and the WTRU may maintain any non-3GPP AP context even if the non-3GPP AP is experiencing errors.

In another embodiment, the non-3GPP AP may indicate that when it recovers from an error that offload may be restarted. The eNB may be informed by the non-3GPP AP. The eNB may initiate the resumption the offloading of data or bearers for the WTRUs. Additionally or alternative, the WTRUs may be informed by the eNB to resume offloading. Additionally or alternatively, the eNB may inform other nodes, such as the MME, LGW, HeNB GW, etc., that offload can be resumed. Additionally or alternatively, the MME may inform other nodes, such as the eNB, LGW, HeNB GW, etc., that offload can be resumed.

Figure 6:
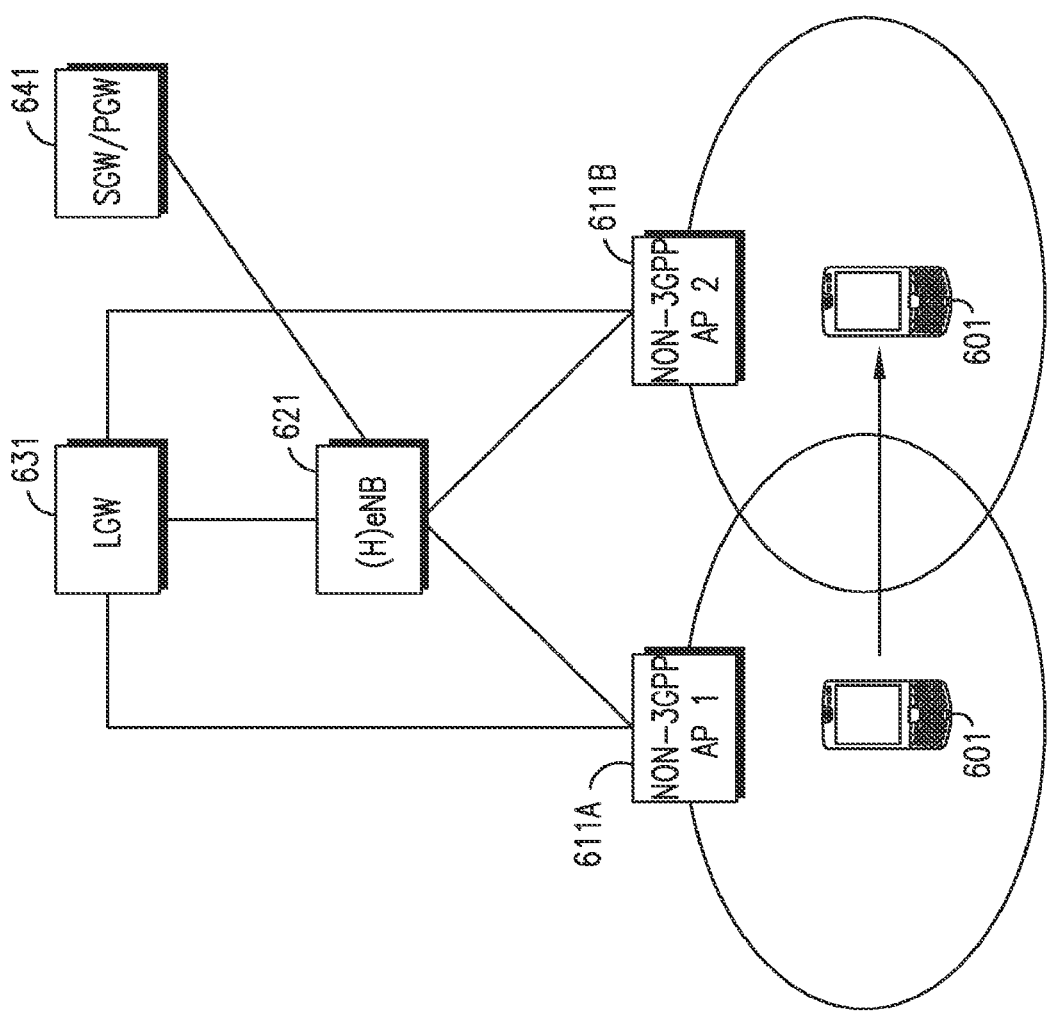
FIG. 6 is a diagram showing an example of a WTRU moving from a first non-3GPP AP to a second non-3GPP AP.
Figure 7:
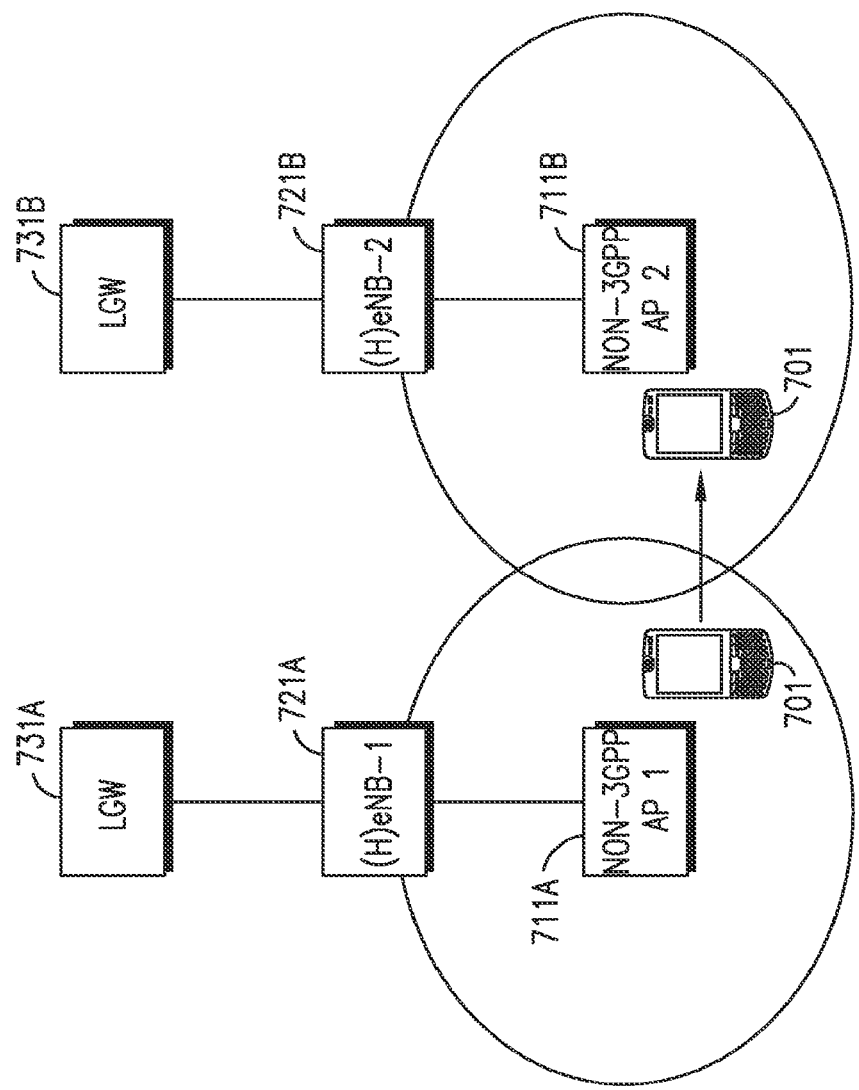
FIG. 7 is a diagram showing an example of a WTRU moving from a first eNB and first non-3GPP AP to a second eNB and a second non-3GPP AP.

In another embodiment, the WTRU, the 3GPP network entities, and the non-3GPP AP can be coordinated to ensure service continuity when the WTRU is handed over from one non-3GPP AP, such as a WiFi AP, to another or from one eNB/HeNB to another. In general there may be two mobility scenarios applicable to the architecture illustrated in FIG. 2. In a first scenario, the WTRU may change (re-associate) to a new non-3GPP AP while remaining connected to the same eNB (or HeNB). An example diagram illustrating this scenario is depicted in FIG. 6. In a second scenario, the WTRU may be handed over to a new eNB (or HeNB) and may also change (re-associate) to a new non-3GPP AP that is connected with the target eNB. An example diagram illustrating this scenario is depicted in FIG. 7.

In an embodiment wherein the WTRU changes non-3GPP APs but maintains a connection with the same (H)eNB such as that depicted by way of example in FIG. 6, offloading to the non-3GPP access may be suspended by the (H)eNB 621. The eNB 621 may stop or suspend the data offloading via non-3GPP AP 611a before the change occurs to prevent or reduce possible data loss during the process of non-3GPP re-association. The eNB 621 can make the decision to suspend the non-3GPP offloading based on the WTRU's measurement report of the non-3GPP AP, which may indicate a better quality non-3GPP AP 611b has been detected, or the quality of current non-3GPP connection has deteriorated below a certain threshold, etc. The eNB 621 may suspend the non-3GPP offloading by itself and buffer the data at eNB 621. Alternatively or additionally, the eNB may request a LGW 631 or HeNB GW (not depicted) to suspend the WiFi offloading, and the data may be buffered at LGW 631 or HeNB GW, respectively. The offloading suspension request message from eNB 621 to the LGW 631 or HeNB GW may include but is not limited to the information: the identification of the WTRU 601, the identification of the bearer/tunnel which is being offloaded to the non-3GPP AP 611a and should be suspended, the identification or address of the non-3GPP AP 611a with which the WTRU 401 is associated, an indication whether the data offloading should be temporarily suspended, or totally stopped and switched back to LTE path.

In another embodiment, after the WTRU is successfully associated with the new non-3GPP AP 611b, the eNB 621, LGW 631, or HeNB GW (not depicted) may resume previous data offloading through the new non-3GPP AP 611b. The eNB 621, LGW 631, or HeNB GW can resume the data offloading and start to send the buffered data to the new non-3GPP AP 611b. Alternatively or additionally, the eNB 621 could request the LGW 631 or HeNB GW to resume the non-3GPP offloading. The eNB 621 may provide the following information to the LGW 631 or HeNB GW, for example in an offloading resume request message: the identification or IP address of the new non-3GPP AP 611b, any IP connection capabilities, such as support of internet protocol security (IPSec), etc., of the new non-3GPP AP 611b, the identification of the WTRU 601, and/or the identification of the bearer or tunnel that should be resumed. After receiving the offloading resume request, the LGW 631 or HeNB-GW may establish a connection, which may be a secure connection, with the new non-3GPP AP 611b and may resume the data offloading.

In yet another embodiment, if the non-3GPP offloading is previously done through the LGW 631 or HeNB GW to the non-3GPP AP 611a, but the new non-3GPP AP 611b does not have an interface with the LGW 631 or HeNB GW, the eNB 621 may request the LGW 631 or HeNB-GW to stop non-3GPP data offloading and switch the data back to the 3GPP path.

In another embodiment wherein the WTRU is handed over to a new eNB 721b and changes non-3GPP APs such as that depicted by way of example in FIG. 7, data may be forwarded over the X2 interface. The source eNB 721a may have buffered data originally intended for non-3GPP offloading during the handover process after the WTRU 701 successfully completes the handover. These buffered data may be forwarded by the source eNB 721a to the target eNB 721b over the X2 interface.

In another embodiment, in the handover preparation process, information may be exchanged between the source eNB 721a and the target eNB 721b including but not limited to the following: an indication of the support for non-3GPP offloading, information, such as addresses, associated with the non-3GPP APs that are under control of the source eNB 721a, the bearer IDs or list of bearers that may be offloaded by the source eNB 721a or that may be subject to offload by the target eNB 721b. The bearer information may be received from the MME, may be sourced from a local configuration in the source eNB 721a or in the target eNB 721b, or may be received from information from the WTRU 701.

In another embodiment, data may be offloaded at the IP layer. The source eNB 721a may forward the data over X2 interface using a secure IP connection or GTP tunnel. The source eNB 721a may initiate the establishment of a secure IP connection, e.g. IPSec tunnel, with the target eNB 721b and may forward the buffered IP packets over the connection. Additionally or alternatively, a GTP tunnel can be created for forwarding non-3GPP-offloaded data. The buffered IP packets may be encapsulated as GTP-U payloads. There may be no PDCP sequence number (SN) in the GTP-U headers. Alternatively or additionally, an indication indicating that the payload is for non-3GPP offloading can be added in the GTP-U header. The X2AP SN Status Transfer message may not need to include the SN information of the bearer that is being non-3GPP offloaded if the offloading is at the IP layer.

In another embodiment, if the data is offloaded at the layers below IP (e.g. PDCP or RLC), the buffered PDCP packets can be forwarded to the target eNB 721*b* using the LTE X2 data forwarding mechanism.

In another embodiment, the target eNB 721*b* may not support non-3GPP offloading. As such, the buffered data, which may be buffered at the source eNB 721*a* or sent back by the non-3GPP AP 711*a* to the eNB 721*a*, that was intended for non-3GPP offload can be converted to normal PDCP packets and the source eNB 721*a* can re-use the current X2 data forwarding mechanism. A SN Status Transfer message may reflect the SN of the converted PDCP packets.

In another embodiment, the source eNB 721*a* may request the LGW 731*a* or HeNB GW to suspend offloading before the handover occurs, for instance, after receiving the A3 triggered measurement report from the WTRU 701. The target eNB 721*b* may request the LGW 731*b* or HeNB GW to resume the offloading after WTRU 701 successfully completes the handover.

In another embodiment, the source eNB 721*a* may send an offloading suspension request message to LGW 731*a* or HeNB GW including, but not limited to, the following information: the identification of the WTRU 701, the identification of the bearers/tunnels which are being offloaded to non-3GPP and should be suspended, the identification/address of the non-3GPP AP 711*a* with which the WTRU 701 is associated, and/or an indication of whether the data offloading should be temporarily suspended or totally stopped and switched back to the 3GPP path.

In another embodiment, the target eNB 721*b* may send an offloading resume request message to LGW 731*b* or HeNB GW including, but not limited to, the following information: the identification or IP address of the new non-3GPP AP 711*b*, any IP connection capabilities (e.g. support of IPSec, etc.) of the new non-3GPP AP 711*b*, the identification of the WTRU 701, the identification of the bearers/tunnels for which offload should be resumed.

In another embodiment, in the handover preparation process, the source eNB 721*a* may exchange with the target eNB 721*b* bearer IDs or a list of bearers that were previously non-3GPP offloaded, and/or bearers that may be subject to offload. The bearers may be based on information received from the MME, from a local configuration, or from information from the WTRU 701. The source eNB 721*a* and target eNB 721*b* may also exchange the identification/IP address of the LGW 731*a*, LGW 731*b*, and/or HeNB-GW that may be handling the non-3GPP offloading.

Figure 8A:
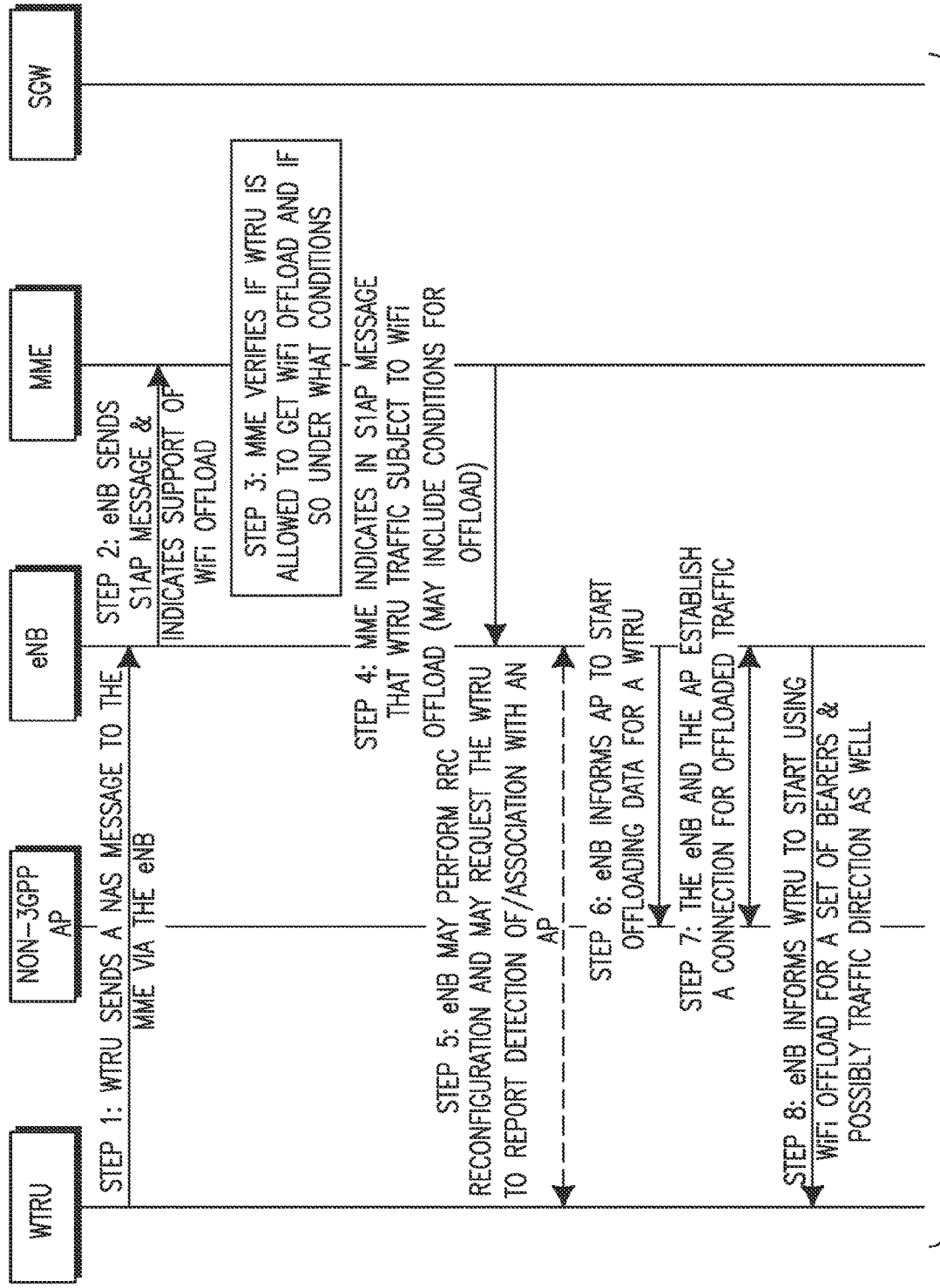
FIGS. 8A and 8B are diagrams showing an example signaling for non-3GPP offload with an eNB.
Figure 8B:
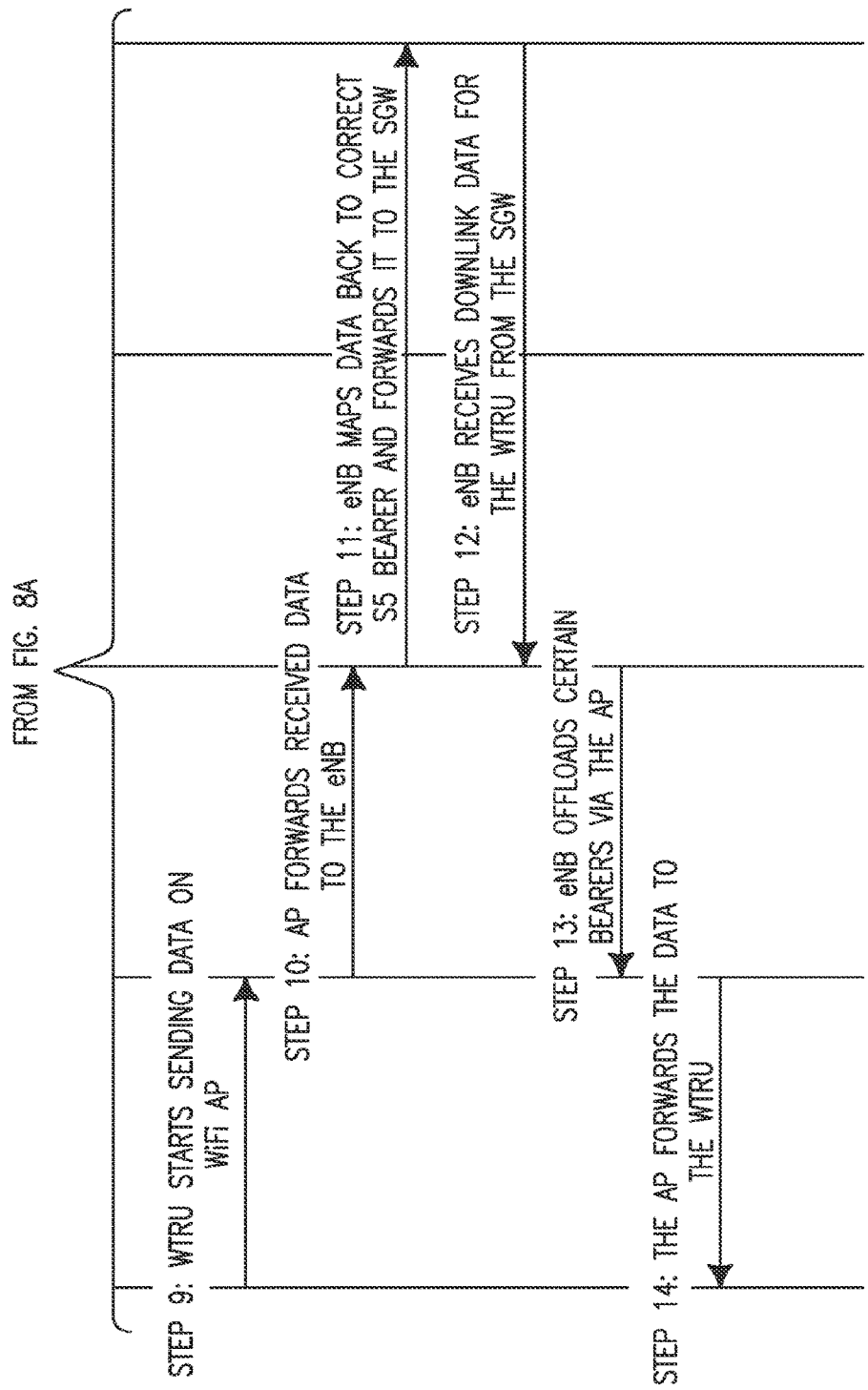

FIGS. 8A and 8B show an example signaling diagram of an embodiment of non-3GPP offloading in accordance with the teachings herein. The signaling is not meant to be limiting to any combination of the features disclosed herein.

In the embodiment as depicted in FIGS. 8A and 8B, the eNB is assumed to have an interface with at least one non-3GPP AP. Further, though the description for FIG. 5 may be directed towards an eNB communicating with the at least one non-3GPP AP, additionally or alternatively, a HeNB, HeNB GW, or LGW may be in communication with the non-3GPP AP and may exchange similar information as that provided by the eNB as described in the following.

The WTRU may enter connected mode and establish an RRC connection mode. As depicted in step 1, the WTRU may, for example, send a NAS message to the MME via the eNB. The NAS message may be a Service Request, PDN Connection Request or other session management request, Attach Request, etc. Additionally or alternatively, the WTRU may send an RRC message to the eNB.

As depicted in step 2, the eNB may forward the NAS message in an S1AP message and the eNB may, for example, include a list of non-3GPP APs to which it connects. The eNB may further indicate whether a non-3GPP AP is collocated with the eNB or not. The eNB may also include addressing information of at least one non-3GPP AP. Further, the eNB may indicate the support of non-3GPP offload to the MME.

As depicted in step 3, the MME may retrieve the WTRU subscription information from the HSS and may do so depending on the NAS message, or the MME may have already retrieved the subscription information. Based on the subscription information, the MME may verify if non-3GPP offload is applicable for the WTRU and the conditions or configurations under which non-3GPP offload is applicable. For example, the availability of non-3GPP offload may be indicated per PDN type, bearer QoS/QCI, etc.

As depicted in step 4, the MME may respond to the eNB with an S1AP message indicating whether or not non-3GPP offload is applicable for the WTRU. The MME may also forward all the conditions under which non-3GPP offload is applicable, for example whether non-3GPP offload is available per bearer, per PDN connection type (e.g. LIPA, etc.), per QoS or QCI, etc. The eNB may set up a connection with the non-3GPP AP for offloading WTRU traffic based on indications from the MME. The eNB may do so when any of the conditions e.g. bearer type, QCI, service type, etc. are met. Alternatively, the eNB may offload WTRU traffic solely based on an indication from the MME that WiFi offload may be permitted for the WTRU in question.

The eNB may inform the non-3GPP AP about a node to contact for offloaded traffic and provide the address of the node. This node may be the eNB itself or an LGW, HeNB GW, etc. The non-3GPP AP may establish a connection with the indicated node using at least one provided address. The eNB may inform the WTRU of the bearers that are subject to offload and may also indicate if the offload is in the downlink, in the uplink, or in both.

As depicted in step 5, the eNB may perform RRC reconfiguration with the WTRU and may setup signaling and radio bearers. The eNB may setup security and may configure the WTRU to measure the signal strength of the non-3GPP AP, e.g. WiFi. The WTRU may report detection of at least one non-3GPP AP to the eNB.

As depicted in step 6, the eNB may contact a non-3GPP AP to indicate the start of offloading for the WTRU. The eNB may be configured with the address of at least one non-3GPP AP or may use indications from the WTRU to contact the appropriate non-3GPP AP. The WTRU may report the non-3GPP AP identity such as MAC address to the eNB. The eNB may also indicate the node that would also be involved in data offloading. FIG. 5 depicts, for example, the eNB itself is involved in the data offloading, but the eNB could have indicated, for example, that the non-3GPP AP should forward uplink data directly to a LGW or a H(e)NB GW and also receive downlink data from the LGW or the H(e)NB GW for the WTRU.

As depicted in step 7, the eNB and the non-3GPP AP may establish a connection for the WTRU. For example, the eNB and the non-3GPP AP may establish a logical connection such that the WTRU's traffic exchanged on this connection.

As depicted step 8, the eNB may indicate to the WTRU the start of non-3GPP offload. The eNB may indicate if the offload is in the uplink only, in the downlink only, or in both directions. The eNB may also indicate the set of bearers that are subject to offload and may, for example, further indicate the direction of offload per bearer.

As depicted in step 9, the WTRU may start offloading certain bearers over to the non-3GPP AP for uplink traffic.

As depicted in step 10, the non-3GPP AP may forward received data from the WTRU to the next node, for example an eNB. The non-3GPP AP may alternatively or additionally forward the received data to the LGW, the HeNB GW, etc.

As depicted in step 11, the eNB may map the received data to the appropriate bearer on the S5 interface and forward the data to the SGW. Alternatively, in step 6, the eNB may have decided that the non-3GPP AP may forward data directly to the LGW or H(e)NB, hence in this alternative example, forwarding the data to the SGW may be effectively skipped.

As depicted in step 12, the eNB may receive data from the SGW. The eNB may verify if the data is subject to offload. For example, the eNB may determine if the data is subject to offload base on QoS or QCI associated with the bearer carrying the data. Alternatively, if a different offloading path has been chosen by the network, appropriate network nodes may determine if the data is subject to offload. For example, the network may have alternatively decided to forward the data from the SGW to a H(e)NB GW and then forward the data to the non-3GPP AP. The determined offloading path may be based on whether direct interfaces between particular network nodes exist.

As depicted in step 13, the eNB may forward the data to the non-3GPP AP for offload. For example, the eNB may forward the data to the non-3GPP AP after determining that the data is subject to offload. For instance, the eNB may determine the data is subject to WiFi offload based on the data satisfying one or more corresponding condition set out in subscription information.

As depicted in step 14, the non-3GPP AP may forward the data to the WTRU.

Note that all of the embodiments above can be applied in any combination. Moreover, though the disclosed embodiments herein may be described with respect to E-UTRAN concept and network elements, any of the embodiments apply to other systems such as GERAN or UTRAN. Furthermore, the embodiments apply on the corresponding or equivalent interfaces or procedures between the network entities in these other systems. For example, all the embodiments herein that apply to an MME could also apply to an SGSN or MSC. In addition, S1AP procedures described herein could also apply to radio access network application part (RANAP) and/or other similar protocols. Similarly, eNB behavior described herein could also apply to RNC/NB/HNB/HNB GW, etc. Furthermore, the offloading procedures may not only apply to packet-switched domain traffic but may apply to circuit-switched (CS) domain traffic.

EMBODIMENTS

1. A method for offloading traffic from a third generation partnership project (3GPP) access network to a non-3GPP access point (AP).

2. The method as in embodiment 1, further comprising a 3GPP access network entity receiving subscription information associated with a wireless transmit receive unit (WTRU).

3. The method as in embodiment 2, further comprising the 3GPP access network entity receiving traffic associated with the WTRU.

4. The method as in embodiment 3, further comprising the 3GPP access network entity determining whether to offload the traffic to the non-3GPP AP based on the subscription information.

5. The method as in embodiment 4, further comprising the 3GPP access network entity forwarding the traffic to the non-3GPP AP based on the determining.

6. The method as in any of embodiments 1-5, wherein the 3GPP access network entity connects directly with the non-3GPP AP.

7. The method as in any of embodiments 1-6, wherein the 3GPP access network entity is one of an evolved Node-B (eNB), home eNB (HeNB), and HeNB gateway (GW).

8. The method as in any of embodiments 1-7, wherein the non-3GPP AP is a WiFi AP.

9. The method as in any of embodiments 2-8, wherein the 3GPP access network entity receiving subscription information further comprises receiving the subscription information from a home subscriber server (HSS).

10. The method as in any of the embodiments 2-9, wherein the subscription information indicates the traffic is subject to offload between the 3GPP access network and the non-3GPP access.

11. The method as in any of the embodiments 2-10, wherein the subscription information indicates a data type or application type of the traffic that is subject to offload.

12. The method as in any of the embodiments 2-11, wherein the subscription information indicates a data type or application type of the traffic that is not subject to offload.

13. The method as in any of the embodiments 2-12, wherein the subscription information indicates a quality of service (QoS) or QoS class indicator (QCI) associated with the traffic that is subject to offload.

14. The method as in embodiment 13, wherein the forwarding the traffic further includes forwarding a bearer carrying a portion of the traffic on a condition the portion of the traffic matches the indicated QoS or QCI.

15. The method as in any of the embodiments 1-14, further comprising identifying the traffic subject to offload by an APN associated with the traffic.

16. The method as in any of the embodiments 1-15, further comprising identifying the traffic subject to offload by an SPID associated with the traffic.

17. The method as in any of the embodiments 1-16, further comprising offloading all traffic except for voice traffic.

18. The method as in any of the embodiments 2-17, wherein the subscription information indicates a traffic direction subject to offloading.

19. The method as in any of the embodiments 2-18, wherein the subscription information indicates default offloading procedures for voice calls and for non-voice data.

20. The method as in any of the embodiments 2-19, wherein the subscription information indicates whether a user has the option to accept or reject non-3GPP offloading.

21. The method as in any of the embodiments 2-20, wherein the subscription information indicates whether offloading is applicable in a particular cell or in a particular type of cell.

22. The method as in any of the embodiments 2-21, further comprising providing the subscription information to an eNB serving the WTRU.

23. The method as in any of the embodiments 2-22, wherein the subscription information indicates a layer at which offloading should be performed.

24. The method as in any of the embodiments 1-23, further comprising indicating a direction or path for offloaded traffic from the non-3GPP AP.

25. The method as in embodiment 24, wherein the traffic is forwarded directly from the non-3GPP AP to an LGW.

26. The method as in any of the embodiments 2-25, further comprising an MME indicating to an eNB serving the WTRU whether uplink, downlink, or both directions of traffic may be subject to offloading.

27. The method as in any of the embodiments 1-26, further comprising indicating a time during which offloading may or may not be allowed.

28. The method as in any of the embodiments 2-27, wherein the subscription information indicates offloading information for each bearer of the traffic.

29. The method as in any of embodiments 2-28, further comprising signaling the WTRU to switch on its non-3GPP radio.

30. The method as in any of the embodiments 2-29, further comprising stopping offloading based on the subscription information.

31. The method as in any of the embodiments 2-30, further comprising stopping offloading when the WTRU's battery level drops below a threshold.

32. The method as in any of the embodiments 1-31, further comprising receiving status information of the non-3GPP AP for controlling the scheduling of offloading.

33. The method as in any of the embodiments 1-32, further comprising the 3GPP access network communicating information to the non-3GPP AP over a control plane.

34. The method as in any of the embodiments 1-33, further comprising coordinating offloading during handover.

35. The method as in embodiment 34, further comprising temporarily suspending offloading until handover completes.

36. The method as in any of embodiments 34-35, further comprising handing over to a new non-3GPP AP.

37. The method as in embodiment 36, further comprising resuming offloading on the new non-3GPP AP.

38. A third generation partnership project (3GPP) access network entity configured to offload data to a non-3GPP access point (AP).

39. The 3GPP access network entity as in embodiment 38, further comprising a receiver configured to receive subscription information, wherein the subscription information includes indications of conditions for offloading traffic associated with a wireless transmit receive unit (WTRU).

40. The 3GPP access network entity as in embodiment 39, wherein the receiver is further configured to receive traffic associated with the WTRU.

41. The 3GPP access network entity as in embodiment 40, further comprising a processor configured to determine whether to offload the data to the non-3GPP AP based on the data satisfying at least one condition indicated in the subscription information.

42. The 3GPP access network entity as in embodiment 41, further comprising a transmitter configured to forward the data to the non-3GPP AP responsive to the processor determining that the data satisfies at least one condition indicated in the subscription information.

43. The 3GPP access network entity as in embodiment 42, wherein the transmitter is further configured to connect directly with the non-3GPP AP.

44. The 3GPP access network entity as in any of embodiments 38-43, wherein the 3GPP access network entity is one of an evolved Node-B (eNB), home eNB (HeNB), and HeNB gateway (GW).

45. The 3GPP access network entity as in any of embodiments 38-44, wherein the non-3GPP AP is a WiFi AP.

46. The 3GPP access network entity as in any of embodiments 39-45, wherein the receiver is further configured to receive subscription information from a home subscriber server (HSS).

47. The 3GPP access network entity as in any of embodiments 39-46, wherein the subscription information indicates the traffic is subject to offload between the 3GPP access network and the non-3GPP access.

48. The 3GPP access network entity as in any of embodiments 39-47, wherein the subscription information indicates a data type or application type of the traffic that is subject to offload.

49. The 3GPP access network entity as in any of embodiments 39-48, wherein the subscription information indicates a data type or application type of the traffic that is not subject to offload.

50. The 3GPP access network entity as in any of embodiments 39-49, wherein the subscription information indicates a quality of service (QoS) or QoS class indicator (QCI) associated with the traffic that is subject to offload.

51. The 3GPP access network entity as in any of embodiments 42-50, wherein the transmitter is further configured to forward a bearer carrying a portion of the traffic on a condition the portion of the traffic matches the indicated QoS or QCI.

52. The 3GPP access network entity as in any of embodiments 38-51, wherein the processor is further configured to identify the traffic subject to offload by an APN associated with the traffic.

53. The 3GPP access network entity as in any of embodiments 38-52, wherein the processor is further configured to identify the traffic subject to offload by an SPID associated with the traffic.

54. The 3GPP access network entity as in any of embodiments 38-53, further configured to offload all traffic except for voice traffic.

55. The 3GPP access network entity as in any of embodiments 39-54, wherein the subscription information indicates a traffic direction subject to offloading.

56. The 3GPP access network entity as in any of embodiments 39-55, wherein the subscription information indicates default offloading procedures for voice calls and for non-voice data.

57. The 3GPP access network entity as in any of embodiments 39-56, wherein the subscription information indicates whether a user has the option to accept or reject non-3GPP offloading.

58. The 3GPP access network entity as in any of embodiments 39-57, wherein the subscription information indicates whether offloading is applicable in a particular cell or in a particular type of cell.

59. The 3GPP access network entity as in any of embodiments 42-58, wherein the transmitter is further configured to provide the subscription information to an eNB serving the WTRU.

60. The 3GPP access network entity as in any of embodiments 39-59, wherein the subscription information indicates a layer at which offloading should be performed.

61. The 3GPP access network entity as in any of embodiments 38-60, further configured to indicate a direction or path for offloaded traffic from the non-3GPP AP.

62. The 3GPP access network entity as in embodiment 61, wherein the traffic is forwarded directly from the non-3GPP AP to an LGW.

63. The 3GPP access network entity as in any of embodiments 38-62, wherein the 3GPP access network entity is an MME, and further wherein the MME is configured to indicate to an eNB serving the WTRU whether uplink, downlink, or both directions of traffic may be subject to offloading.

64. The 3GPP access network entity as in any of embodiments 38-63, further configured to indicate a time during which offloading may or may not be allowed.

65. The 3GPP access network entity as in any of embodiments 38-64, wherein the subscription information indicates offloading information for each bearer of the traffic.

66. The 3GPP access network entity as in any of embodiments 42-65, wherein the transmitter is further configured to signal the WTRU to switch on its non-3GPP radio.

67. The 3GPP access network entity as in any of embodiments 39-66, further configured to stop offloading based on the subscription information.

68. The 3GPP access network entity as in any of embodiments 39-67, further configured to stop offloading when the WTRU's battery level drops below a threshold.

69. The 3GPP access network entity as in any of embodiments 39-68, the receiver further configured to receive status information of the non-3GPP AP for controlling the scheduling of offloading.

70. The 3GPP access network entity as in any of embodiments 42-69, wherein the transmitter is further configured to communicate information to the non-3GPP AP over a control plane.

71. The 3GPP access network entity as in any of embodiments 38-70, further configured to coordinate offloading during handover.

72. The 3GPP access network entity as in embodiment 71, further configured to temporarily suspend offloading until handover completes.

73. The 3GPP access network entity as in any of embodiments 71-72, further configured to hand over the WTRU to a new non-3GPP AP.

74. The 3GPP access network entity as in embodiment 73, further configured to resume offloading on the new non-3GPP AP.

75. Any of the embodiments 1-74, wherein there is a direct interface between the 3GPP access network entity and the non-3GPP AP.

76. Any of the embodiments 1-75, wherein the 3GPP access network is an LTE access network.

77. Any of the embodiments 1-76, wherein the 3GPP access network is an LTE-A access network.

78. Any of the embodiments 1-77, wherein the 3GPP access network is a UMTS access network (UTRAN).

79. Any of the embodiments 1-78, wherein the 3GPP access network is a GPRS access network (GERAN).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, performed by a network entity associated with a wireless network including a wireless transmit receive unit (WTRU), the method comprising:
    receiving subscription information, including information indicating: (1) whether traffic associated with a packet data network (PDN) is subject to offload between a first wireless access network and a second wireless access network, and (2) at least one condition for offloading the traffic to an access point (AP) of the second wireless access network; and
    responsive to determining that the at least one condition for offloading the traffic to an AP of the second wireless access network allows for offloading, transmitting configuration information to the WTRU via an access network entity of the first access network, the configuration information indicating that the traffic is subject to offload,
    wherein the traffic that is subject to offload: (i) is associated with the network entity, and (ii) includes traffic destined for the WTRU and traffic originating from the WTRU.

2. The method of claim 1, wherein the network entity is a 3rd Generation Partnership Project (3GPP) network entity that is any of a Mobility Management Entity (MME), a Serving GPRS Support Node (SGSN), and a Mobile Switching Center (MSC), and wherein the access network entity is a 3GPP access network entity that is any of an evolved Node-B (eNB), a home eNB (HeNB), a HeNB gateway (GW), a Packet Data Network gateway (PDN GW or P-GW), and a Gateway General Packet Radio Service (GPRS) Support Node (GGSN).

3. The method of claim 2, wherein the network entity is a first MME, the method further comprising the first MME forwarding an indication of whether traffic associated with a PDN is offloadable or not offloadable to a second MME.

4. The method of claim 1, wherein the subscription information is received from a home subscriber server (HSS).

5. The method of claim 1, wherein the subscription information further includes an indication of a PDN for which associated traffic cannot be offloaded.

6. The method of claim 1, wherein the subscription information indicates a PDN for which associated traffic is subject to offload.

7. The method of claim 6, further comprising providing information, via non-access stratum (NAS) signaling to the WTRU, indicating the PDN.

8. The method of claim 1, wherein the subscription information indicates whether offloading is allowed or prohibited for an AP name (APN).

9. The method of claim 1, wherein the traffic is offloaded to a non-3GPP AP that is a WiFi AP: (1) to which the traffic destined for the WTRU is forwarded; and (2) which communicates the traffic wirelessly and directly to the WTRU.

10. A network entity comprising circuitry including any of a transmitter, a receiver, a processor and memory, associated with a wireless network including a wireless transmit receive unit (WTRU), the network entity configured to:
- receive subscription information, including information indicating: (1) whether traffic associated with a packet data network (PDN) is subject to offload between a first wireless access network and a second wireless access network, and (2) at least one condition for offloading the traffic to an access point (AP) of the second wireless access network; and
- responsive to determining that the at least one condition for offloading the traffic to an AP of the second wireless access network allows for offloading, transmit configuration information to the WTRU via an access network entity of the first access network, the configuration information indicating that the traffic is subject to offload,
- wherein the traffic that is subject to offload: (i) is associated with the network entity, and (ii) includes traffic destined for the WTRU and traffic originating from the WTRU.

11. The network entity of claim 10, wherein the network entity is a 3rd Generation Partnership Project (3GPP) network entity that is any of a Mobility Management Entity (MME), a Serving GPRS Support Node (SGSN), and a Mobile Switching Center (MSC), and
- wherein the access network entity is a 3GPP access network entity that is any of an evolved Node-B (eNB), a home eNB (HeNB), a HeNB gateway (GW), a Packet Data Network gateway (PDN GW or P-GW), and a Gateway General Packet Radio Service (GPRS) Support Node (GGSN).

12. The network entity of claim 11, wherein the network entity is a first MME, the method further comprising the first MME forwarding an indication of whether traffic associated with a PDN is offloadable or not offloadable to a second MME.

13. The network entity of claim 10, wherein the subscription information is received from a home subscriber server (HSS).

14. The network entity of claim 10, wherein the subscription information further includes an indication of a PDN for which associated traffic cannot be offloaded.

15. The network entity of claim 10, wherein the subscription information indicates a PDN for which associated traffic is subject to offload.

16. The network entity of claim 10, further configured to provide information, via non-access stratum (NAS) signaling to the WTRU, indicating the PDN.

17. The network entity of claim 10, wherein the subscription information indicates whether offloading is allowed or prohibited for an AP name (APN).

18. The network entity of claim 10, wherein the traffic is offloaded to a non-3GPP AP that is a WiFi AP: (1) to which traffic destined for the WTRU is forwarded; and (2) which communicates the traffic wirelessly and directly to the WTRU.

* * * * *